(12) United States Patent
    Takabatake et al.

(10) Patent No.: US 10,559,841 B2
(45) Date of Patent: Feb. 11, 2020

(54) FUEL CELL AND MANUFACTURING METHOD OF FUEL CELL

(71) Applicant: TOYOTA JIDOSHA KABUSHIKI KAISHA, Toyota-shi, Aichi-ken (JP)

(72) Inventors: Yuma Takabatake, Toyota (JP); Hiroaki Nishiumi, Toyota (JP); Michitaro Itoga, Okazaki (JP); Masahiko Nishikawa, Mishima (JP)

(73) Assignee: TOYOTA JIDOSHA KANUSHIKI KAISHA, Toyota-shi (JP)

( * ) Notice: Subject to any disclaimer, the term of this patent is extended or adjusted under 35 U.S.C. 154(b) by 54 days.

(21) Appl. No.: 15/622,494

(22) Filed: Jun. 14, 2017

(65) Prior Publication Data
    US 2017/0365872 A1    Dec. 21, 2017

(30) Foreign Application Priority Data
    Jun. 21, 2016  (JP) .................. 2016-122193

(51) Int. Cl.
    | | |
    |---|---|
    | *H01M 8/247* | (2016.01) |
    | *H01M 8/2475* | (2016.01) |
    | *H01M 8/0232* | (2016.01) |
    | *H01M 8/0239* | (2016.01) |
    | *H01M 8/025* | (2016.01) |
    | *H01M 8/242* | (2016.01) |
    | *H01M 8/1018* | (2016.01) |

(52) U.S. Cl.
    CPC .......... *H01M 8/247* (2013.01); *H01M 8/025* (2013.01); *H01M 8/0232* (2013.01); *H01M 8/0239* (2013.01); *H01M 8/2475* (2013.01); *H01M 8/242* (2013.01); *H01M 2008/1095* (2013.01); *Y02P 70/56* (2015.11)

(58) Field of Classification Search
    None
    See application file for complete search history.

(56) References Cited

U.S. PATENT DOCUMENTS

| | | |
|---|---|---|
| 2008/0102343 A1 | 5/2008 | Cho et al. |
| 2009/0130530 A1 | 5/2009 | Tanaka |
| 2014/0322626 A1 | 10/2014 | Naito |

(Continued)

FOREIGN PATENT DOCUMENTS

| | | |
|---|---|---|
| DE | 112006002637 T5 | 8/2008 |
| DE | 102012024963 A1 | 6/2014 |
| JP | 2005-47492 A | 2/2005 |

(Continued)

*Primary Examiner* — Daniel S Gatewood
(74) *Attorney, Agent, or Firm* — Dickinson Wright, PLLC

(57) ABSTRACT

There is provided a fuel cell comprising a cell stacked body and a case configured to surround at least stacked body side faces of the cell stacked body. The case comprises a first case configured to include a first case side wall and a pair of first opposed side walls that are arranged to rise from a circumference of the first case side wall such as to have a draft angle; and a second case configured to include a second case side wall and a pair of second opposed side walls that are arranged to rise from a circumference of the second case side wall such as to have a draft angle. A first edge of each of the first opposed side walls is joined with a second edge of each of the second opposed side walls. This configuration suppresses size expansion of the fuel cell.

5 Claims, 15 Drawing Sheets

(56) References Cited

U.S. PATENT DOCUMENTS

2015/0194696 A1 7/2015 Kim et al.
2016/0254563 A1 9/2016 Sato et al.

FOREIGN PATENT DOCUMENTS

| | | | | |
|---|---|---|---|---|
| JP | 2005047492 | A | * | 2/2005 |
| JP | 2006196386 | A | | 7/2006 |
| JP | 2008-112708 | A | | 5/2008 |
| JP | 2010-267465 | A | | 11/2010 |
| JP | 2010267465 | A | * | 11/2010 |
| JP | 2012-138516 | A | | 7/2012 |
| JP | 2012138516 | A | * | 7/2012 |
| JP | 2013152830 | A | | 8/2013 |
| JP | 2014183015 | A | | 9/2014 |
| JP | 2014-216268 | A | | 11/2014 |
| JP | 2015-015220 | A | | 1/2015 |
| JP | 2015-082370 | A | | 4/2015 |
| JP | 2015-150595 | A | | 8/2015 |
| JP | 2015-223590 | A | | 12/2015 |
| JP | 2016-012408 | A | | 1/2016 |
| JP | 2016-76309 | A | | 5/2016 |

\* cited by examiner

FUEL CELL AND MANUFACTURING METHOD OF FUEL CELL

CROSS-REFERENCE TO RELATED APPLICATIONS

The present application claims priority from Japanese patent application 2016-122193 filed on Jun. 21, 2016, the entirety of the content of which is hereby incorporated by reference into this application.

BACKGROUND

Field

The present disclosure relates to fuel cell-related technology.

Related Art

In a known configuration of a fuel cell, a cell stacked body provided by stacking a plurality of unit cells is placed in a case (as described in, for example, JP 2015-15220A).

In the prior art fuel cell, the case includes a concave member and a plate configured to block an opening of the concave member. The concave member and the plate are arranged to surround side faces of the cell stacked body. A draft angle that is extended to the outer side of the case may be formed in the concave member in its manufacturing process. When the concave member with the draft angle is used as a component of the case, this configuration is likely to increase the size of the case due to the draft angle and thereby increase the size of the fuel cell. There is accordingly a demand for a technique that suppresses size expansion of the fuel cell.

SUMMARY

In order to solve at least part the problems described above, the disclosure may be implemented by aspects described below.

(1) According to one aspect of the disclosure, there is provided a fuel cell. The fuel cell comprises a cell stacked body provided by stacking a plurality of unit cells and configured to include stacked body side faces arranged along a stacking direction of the plurality of unit cells; and a case configured to surround at least the stacked body side faces of the cell stacked body. The case comprises a first case configured to include a first case side wall and a pair of first opposed side walls that are arranged to rise from a circumference of the first case side wall such as to have a draft angle and are configured to be opposed to each other across the cell stacked body; and a second case configured to include a second case side wall that is opposed to the first case side wall across the cell stacked body, and a pair of second opposed side walls that are arranged to rise from a circumference of the second case side wall such as to have a draft angle and are configured to be opposed to each other across the cell stacked body. A first edge of each of the first opposed side walls on an opposite side that is opposite to the first case side wall is joined with a second edge of each of the second opposed side walls on an opposite side that is opposite to the second case side wall. In the fuel cell of this aspect, the first edge of each of the first opposed side walls having the draft angle is joined with the second edge of each of the second opposed side walls having the draft angle. This configuration suppresses size expansion of the case due to the draft angles, compared with the configuration of a case formed by attaching a plate to a concave member having a draft angle.

(2) In the fuel cell of the above aspect, a total length of the first opposed side wall and the second opposed side wall that are joined with each other in a first direction in which the first case side wall and the second case side wall are opposed to each other, may be shorter than a length of the case in a second direction in which the pair of first opposed side walls are opposed to each other. In the fuel cell of this aspect, a wall of a short length is configured by the first opposed side wall and the second opposed side wall respectively having the draft angles. This configuration further suppresses size expansion of the case due to the draft angles.

(3) In the fuel cell of the above aspect, each of the pair of first opposed side walls may have a length in a first direction in which the first case side wall and the second case side wall are opposed to each other, that is not less than ⅓ and not greater than ⅔ of a total length of the first opposed side wall and the second opposed side wall that are joined with each other in the first direction. Each of the pair of second opposed side walls may have a length in the first direction that is not less than ½ and not greater than ⅔ of the total length of the first opposed side wall and the second opposed side wall that are joined with each other in the first direction. This configuration further suppresses size expansion of the case due to the draft angles.

(4) The fuel cell of the above aspect may further comprise a pair of side wall intervening layers that are placed between a wall constituting part of the case formed by the first opposed side wall and the second opposed side wall that are joined with each other, and the stacked body side faces and are arranged to be in contact with the wall and with the stacked body side faces. The pair of side wall intervening layers may be compressed by the wall and the stacked body side faces and may be arranged across joint portions of the first edges and the second edges in a first direction in which the first case side wall and the second case side wall are opposed to each other. This configuration is less likely to cause a variation in degree of compression of the side wall intervening layers in the first direction.

(5) The fuel cell of the above aspect may further comprise a pair of side wall intervening layers that are placed between a wall constituting part of the case formed by the first opposed side wall and the second opposed side wall that are joined with each other, and the stacked body side faces and are arranged to be in contact with the wall and with the stacked body side faces. One of the pair of side wall intervening layers may be placed on one side where the first case side wall is located relative to a center of the case in a first direction in which the first case side wall and the second case side wall are opposed to each other. The other of the pair of side wall intervening layers may be placed on the other side where the second case side wall is located relative to the center of the case in the first direction. When an external force is applied to the case, the position near to the center of the case has a larger amount of deformation of the case, compared with a corner edge forming an end of the case. The first case side wall or the second case side wall provides the corner edge that forms the end of the case in the first direction. In this configuration, the pair of side wall intervening layers are arranged at the positions deviated from the center of the case in the first direction. This configuration reduces the possibility that the conditions of the pair of side wall intervening layers (for example, the state of contact with another member) are changed by the deformation of the case, compared with the configuration that the pair of side wall intervening layers are arranged at the center in the first direction. For example, even when the case is expanded to the outer side of the case to be away from the cell stacked body, this configuration reduces the possibility that the pair of side wall intervening layers are separated from the walls of the case and the stacked body side faces.

(6) In the fuel cell of the above aspect, one of the pair of side wall intervening layers may be placed on a side nearer to the first case side wall relative to the center of the case in the first direction. The other of the pair of side wall intervening layers may be placed on a side nearer to the second case side wall relative to the center of the case in the first direction. In the fuel cell of this aspect, the pair of side wall intervening layers are arranged at the positions nearer to the first case side wall and nearer to the second case side wall than the center of the case in the first direction. This configuration further reduces the possibility that the conditions of the pair of side wall intervening layers (for example, the state of contact with another member) are changed by the deformation of the case.

(7) In the fuel cell of the above aspect, the case may further comprise a case bottom wall that is located on one side of the cell stacked body in the stacking direction. The first case may further comprise a first intersecting wall that is arranged to rise from the circumference of the first case side wall such as to have a draft angle and is configured to intersect with the pair of first opposed side walls. The second case may further comprise a second intersecting wall that is arranged to rise from the circumference of the second case side wall such as to have a draft angle and is configured to intersect with the pair of second opposed side walls. A third edge of the first intersecting wall on an opposite side that is opposite to the first case side wall may be joined with a fourth edge of the second intersecting wall on an opposite side that is opposite to the second case side wall. The first intersecting wall and the second intersecting wall may constitute the case bottom wall. This configuration suppresses size expansion of the case in the stacking direction due to the draft angles.

(8) According to another aspect of the disclosure, there is provided a manufacturing method of the fuel cell of the above aspect. The manufacturing method comprises (a) a process of placing the first edge and the second edge to abut with each other in an abutment portion and joining the abutment portion by friction stir welding; and (b) a process of placing at least the cell stacked body inside of the case, after the process (a). The configuration of joining the first case with the second case by friction stir welding enables the first case and the second case to be joined with each other in the lower temperature conditions of the first case and the second case, compared with the configuration of joining the first case with the second case by laser welding. This configuration reduces the possibility that the first case and the second case are deformed by heat.

(9) According to another aspect of the disclosure, there is provided a manufacturing method of the fuel cell of the above aspect. The manufacturing method comprise (a) a process of placing the first edge and the second edge to abut with each other in a first abutment portion and joining the first abutment portion by friction stir welding; (b) a process of placing the third edge and the fourth edge to abut with each other in a second abutment portion and joining the second abutment portion by friction stir welding; and (c) a process of placing at least the cell stacked body inside of the case, after the process (a) and the process (b). The configuration of joining the first case with the second case by friction stir welding enables the first case and the second case to be joined with each other in the lower temperature conditions of the first case and the second case, compared with the configuration of joining the first case with the second case by laser welding. This configuration reduces the possibility that the first case and the second case are deformed by heat.

(10) In the manufacturing method of the fuel cell of the above aspect, the process (a) may perform the friction stir welding by using a first tool configured to include a first shoulder portion in a columnar shape and a first pin protruded from an end surface of the first shoulder portion. The process (b) may perform the friction stir welding by using a second tool configured to include a second shoulder portion in a columnar shape that has a different diameter from a diameter of the first shoulder portion, and a second pin protruded from an end surface of the second shoulder portion. The manufacturing method of this aspect uses the first tool and the second tool having different diameters for friction stir welding. This configuration enables part of a joint region using the first tool to be overlapped with part of a joint region using the second tool at a corner where a wall configured by the first case side wall and the second case side wall intersects with the case bottom wall. This reduces the possibility that a non-joint region appears at the corner.

The present disclosure may be implemented by any of various aspects other than the aspects of the fuel cell and the manufacturing method of the fuel cell described above, for example, a case configured to place a cell stacked body and intervening layers therein and a vehicle with the fuel cell mounted thereon.

DESCRIPTION OF EMBODIMENTS

A. Embodiment

A-1. Configuration of Fuel Cell 100

Figure 1:
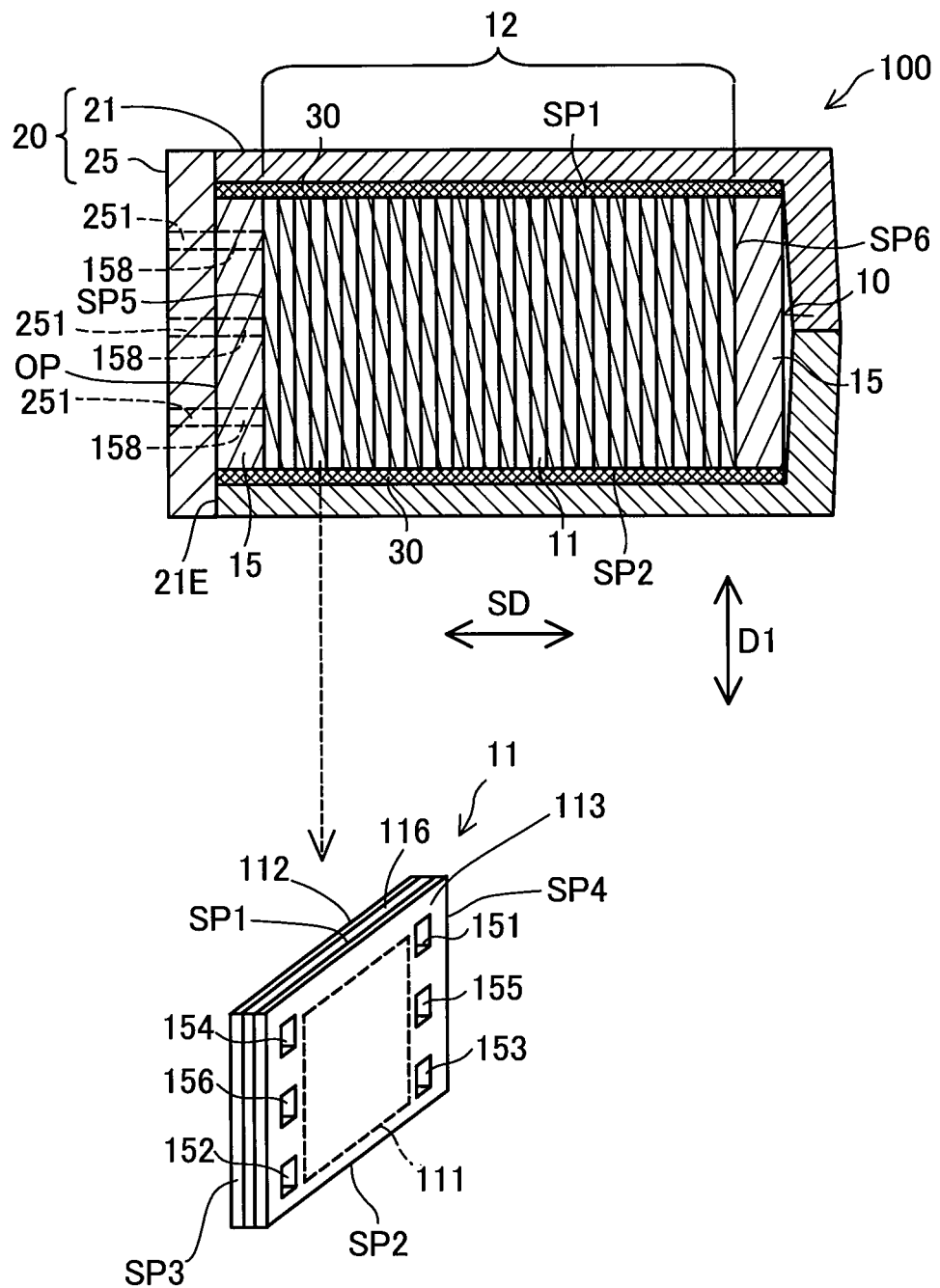
FIG. 1 is a sectional view illustrating a fuel cell according to one embodiment of the disclosure.

FIG. 1 is a sectional view illustrating a fuel cell 100 according to one embodiment of the disclosure. The sectional view of FIG. 1 illustrates the fuel cell 100 arranged parallel to a stacking direction SD of a plurality of cells 11 and parallel to a first direction D1 that is a vertical direction of the sheet surface. The stacking direction SD is orthogonal to the first direction D1. FIG. 1 also illustrates a perspective view of the unit cell 11 below the sectional view on the upper side.

A fuel cell system may be configured by the fuel cell 100, along with, for example, supply systems of reactive gases (fuel gas and oxidizing gas) and a supply system of a cooling medium. This fuel cell system is mounted and used on, for example, a vehicle (for example, a motor vehicle) as a system configured to serve as the power supply for driving. The fuel cell 100 may be placed, for example, in a front room that is located on the front side of a vehicle interior of the motor vehicle. The fuel cell 100 is configured to include a fuel cell main body 10, a housing 20 and intervening layers 30.

The fuel cell main body 10 is configured to include a cell stacked body 12 configured by stacking a plurality of the unit cells 11 and a pair of terminal plates 15. The cell stacked body 12 is formed in an approximately rectangular parallelepiped appearance shape. The cell stacked body 12 is configured to include stacked body side faces SP1 to SP4 arranged along the stacking direction SD of the plurality of unit cells 11 and a pair of stacked body end side faces SP5 and SP6 located on the respective ends in the stacking direction SD. The expression of "along the stacking direction SD" means the concept including not only strictly parallel to the stacking direction SD but approximately parallel to the stacking direction SD. When there is a need to distinguish among the stacked body side faces SP1 to SP4, they are called "first stacked body side face SP1", "second stacked body side face SP2", "third stacked body side face SP3" and "fourth stacked body side face SP4". When there is a need to distinguish between the pair of stacked body end side faces SP5 and SP6, they are called "first stacked body end side face SP5" and "second stacked body end side face SP6". Each of the stacked body side faces SP1 to SP4 is formed in a rectangular outer shape when being viewed from one side in the stacking direction SD of the plurality of unit cells 11 (for example, from right side of the sheet surface).

The unit cell 11 is a polymer electrolyte fuel cell. The unit cell 11 is configured to include a membrane electrode assembly 111, a pair of separators 112 and 113 arranged across the membrane electrode assembly 111 and a frame-like resin sheet 116 attached to the periphery of the membrane electrode assembly 111. The membrane electrode assembly 111 is configured to include an electrolyte membrane, two catalyst layers arranged across and formed on the respective surfaces of the electrolyte membrane, and two gas diffusion layers arranged across the electrolyte membrane and the two catalyst layers. According to this embodiment, the electrolyte membrane is provided as a fluororesin-based ion exchange membrane including sulfonate group. The electrolyte membrane is, however, not limited to the membrane including the sulfonate group but may be a membrane including another ion exchange group, for example, phosphate group or carboxylic group. The catalyst layer is formed from a base material (catalyst-supported body) configured such that a catalyst such as platinum or a platinum alloy is supported on a carrier having electrical conductivity (for example, carbon particles). The gas diffusion layer is formed from a porous member. The porous member may be, for example, a carbon porous body such as carbon paper or a metal porous body such as metal mesh or metal foam. The separator is formed from a gas-impermeable conductive member. For example, dense carbon formed by compressing carbon to be gas impermeable or a press-formed metal plate may be employed as the gas-impermeable conductive member. The resin sheet 116 is a member used to seal the inside of the unit cell 11.

The unit cell 11 is configured to include flow paths for reactive gases and flow paths for a cooling medium, which are formed to pass through the unit cell 11 in the stacking direction SD. More specifically, the unit cell 11 is configured to include an oxidizing gas supply flow path 151, an oxidizing gas discharge flow path 152, a fuel gas supply flow path 153, a fuel gas discharge flow path 154, a cooling medium supply flow path 155 and a cooling medium discharge flow path 156. The respective flow paths formed in the respective unit cells 11 are arranged to be overlapped in the stacking direction SD, so as to form an oxidizing gas supply manifold, an oxidizing gas discharge manifold, a fuel gas supply manifold, a fuel gas discharge manifold, a cooling medium supply manifold and a cooling medium discharge manifold (not shown) inside of the cell stacked body 12.

Each of the pair of terminal plates 15 is provided as a plate-like member formed in a rectangular outer shape when being viewed from one side in the stacking direction SD (for example, from right side of the sheet surface). The pair of terminal plates 15 are placed on the respective sides of the cell stacked body 12 in the stacking direction SD and are configured to collect the electric current generated in the cell stacked body 12. The pair of terminal plates 15 are also configured to apply a predetermined clamping force to the cell stacked body 12 from the respective sides in the stacking direction SD of the cell stacked body 12. Out of the pair of terminal plates 15, the terminal plate 15 on the side where a cover member 25 described later is placed, is configured to include six connection ports 158 (only three are illustrated in the drawing) that are arranged to communicate with the respective manifolds formed in the cell stacked body 12.

The housing 20 is configured such that the cell stacked body 12, the pair of terminal plates 15 and the intervening layers 30 are placed therein. The housing 20 is configured to include a case 21 and a cover member 25.

The case 21 is formed in a concave shape that is open on one side in the stacking direction (on the left side of the sheet surface of FIG. 1). The case 21 is configured to surround the stacked body side faces SP1 to SP4 and the second stacked body end side face SP6 of the cell stacked body 12. The cover member 25 is attached to an end face 21E that is formed to define an opening OP of the case 21, by means of clamping members such as screws. The cover member 25 is arranged to close the opening OP of the case 21. The cover member 25 is configured to include six connection ports 251 (only three are illustrated in the drawing) that are arranged to communicate with the respective manifolds formed in the cell stacked body 12. The case 21 and the cover member 25 are made of a metal such as aluminum or titanium. Insulating members such as rubber members are placed between the case 21 and the terminal plate 15 that are adjacent to each other in the stacking direction SD and between the cover member 25 and the terminal plate 15 that are adjacent to each other in the stacking direction SD, such as to insulate the terminal plate 15 from the case 21 and insulate the terminal plate 15 from the cover member 25.

The intervening layers 30 are placed between the case 21 and the stacked body side faces SP1 to SP4 and are arranged to be in contact with inner surfaces of the case 21 and with the stacked body side faces SP1 to SP4. The intervening layers 30 are configured to have elasticity and are placed inside of the case 21 such as to be compressed by the case 21 and the stacked body side faces SP1 to SP4. The intervening layers 30 are configured to provide a function of suppressing vibration generated in the cell stacked body 12 under application of an external force to the fuel cell 100 (vibration suppressing function) and a function of reducing a position misalignment in a direction orthogonal to the stacking direction SD of the respective unit cells 11 (position misalignment reducing function). According to this embodiment, the intervening layers 30 are made of silicone rubber. According to a modification, the intervening layers 30 may be made of another material having elasticity, in place of silicone rubber. The intervening layer 30 may have another configuration that provides the vibration suppressing function and the position misalignment reducing function. For example, the intervening layer 30 may be configured to include a dilatant fluid and a bag body provided to place the dilatant fluid therein. The dilatant fluid behaves like a solid in response to an abrupt change, while providing the fluidity with respect to a slow deformation. An example of the dilatant fluid may be a material obtained by adding a trace amount of a catalyst (for example, iron chloride or nickel chloride) to a mixture of silicone oil and boric acid and kneading and drying the resulting mixture in a high temperature environment (for example, at temperature of or over 100 C). Available examples of such a material include Dow Corning 3179 ("Dow Corning" is registered trademark) manufactured by Dow Corning Corp. and M48 and M49 manufactured by Wacker GmbH. The intervening layers 30 are extended over the respective ends of the stacked body side faces SP1 to SP4 in the stacking direction SD.

Figure 2:
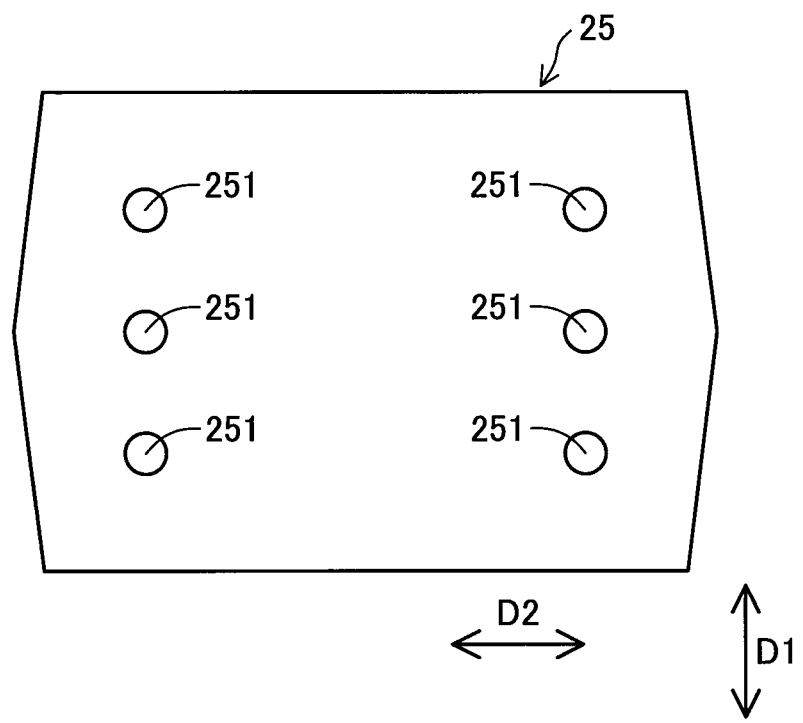
FIG. 2 is a diagram illustrating a cover member when being viewed from one side in a stacking direction.
Figure 3:
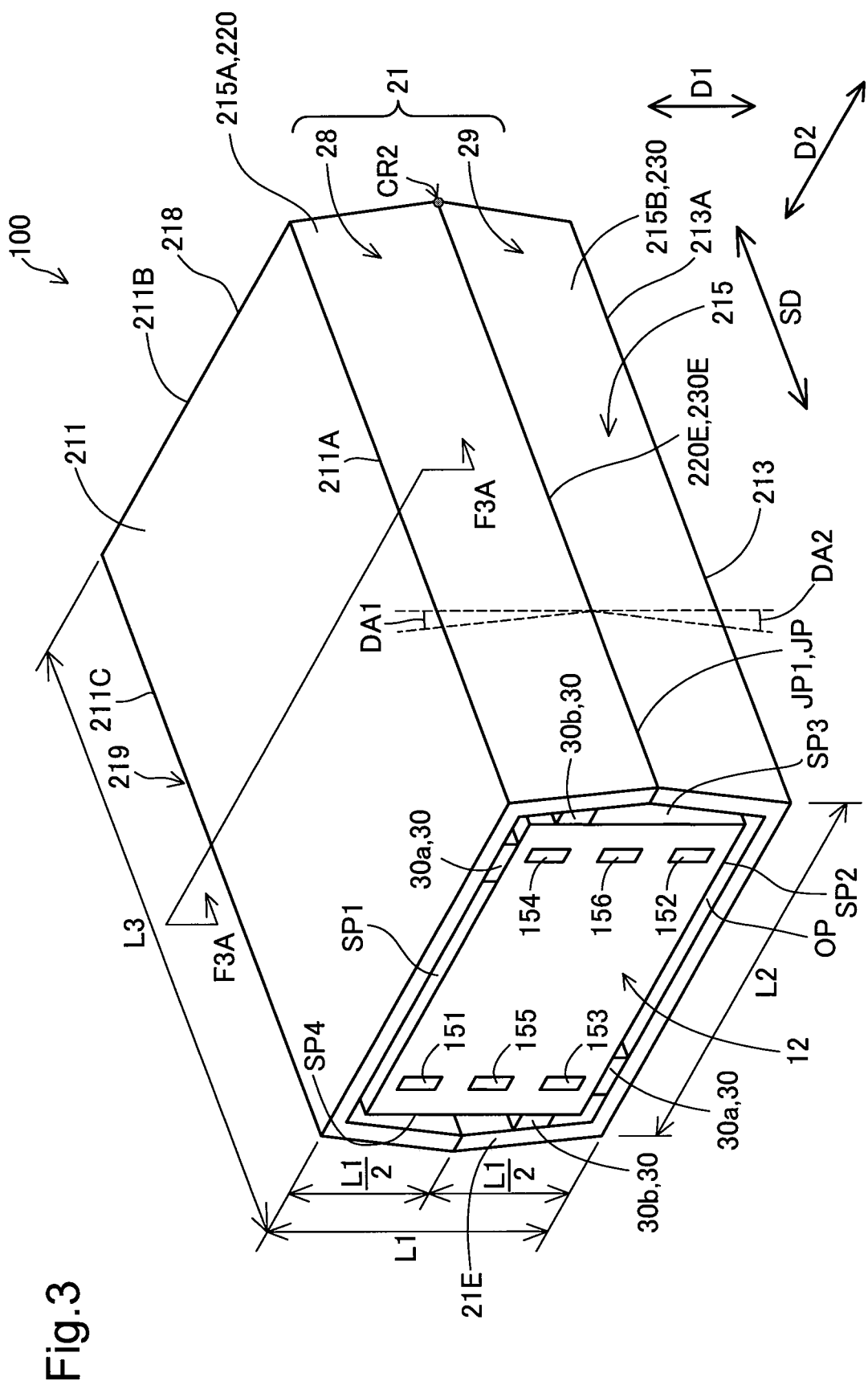
FIG. 3 is a perspective view schematically illustrating the fuel cell.
Figure 4:
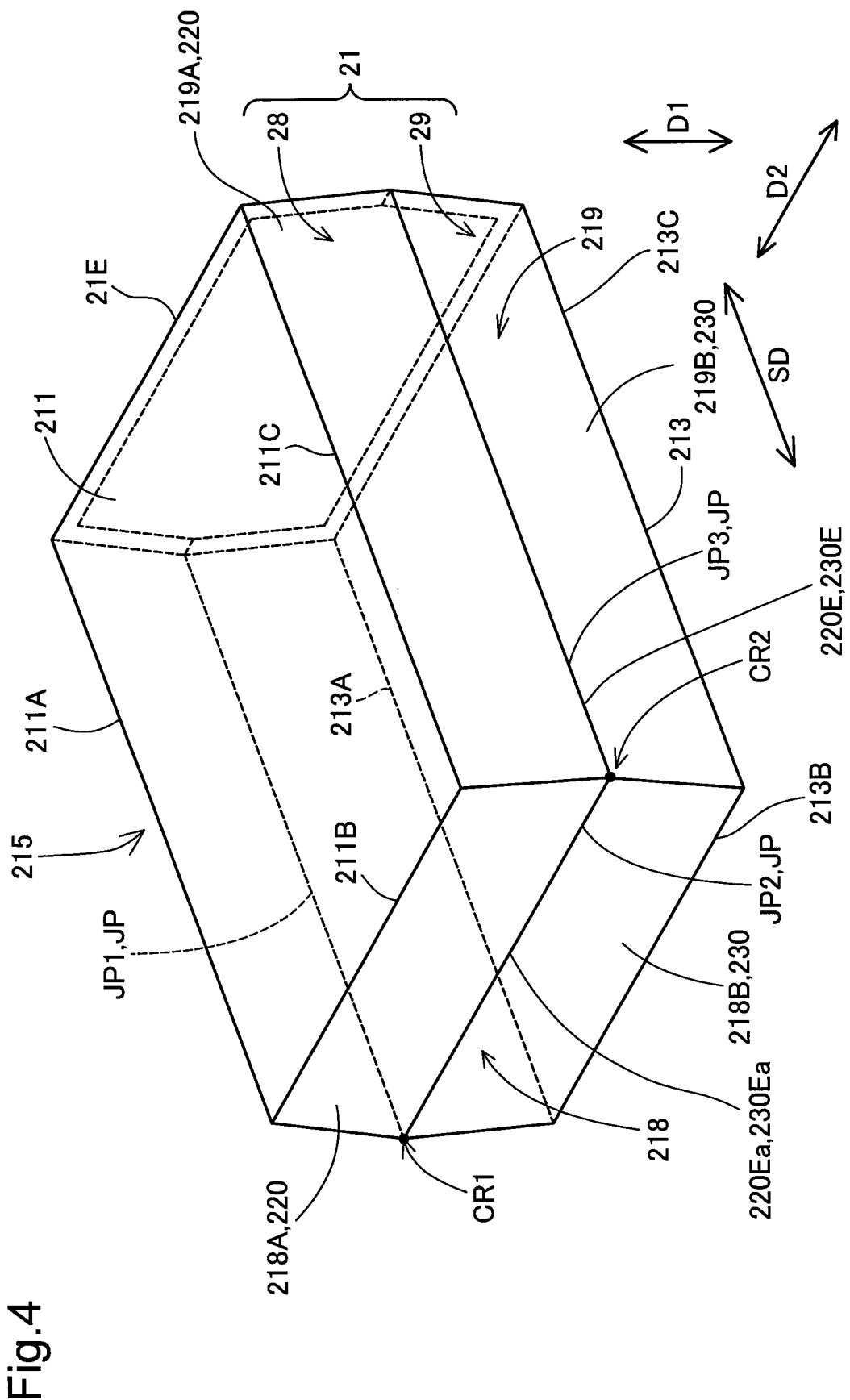
FIG. 4 is a perspective view schematically illustrating a case.
Figure 5:
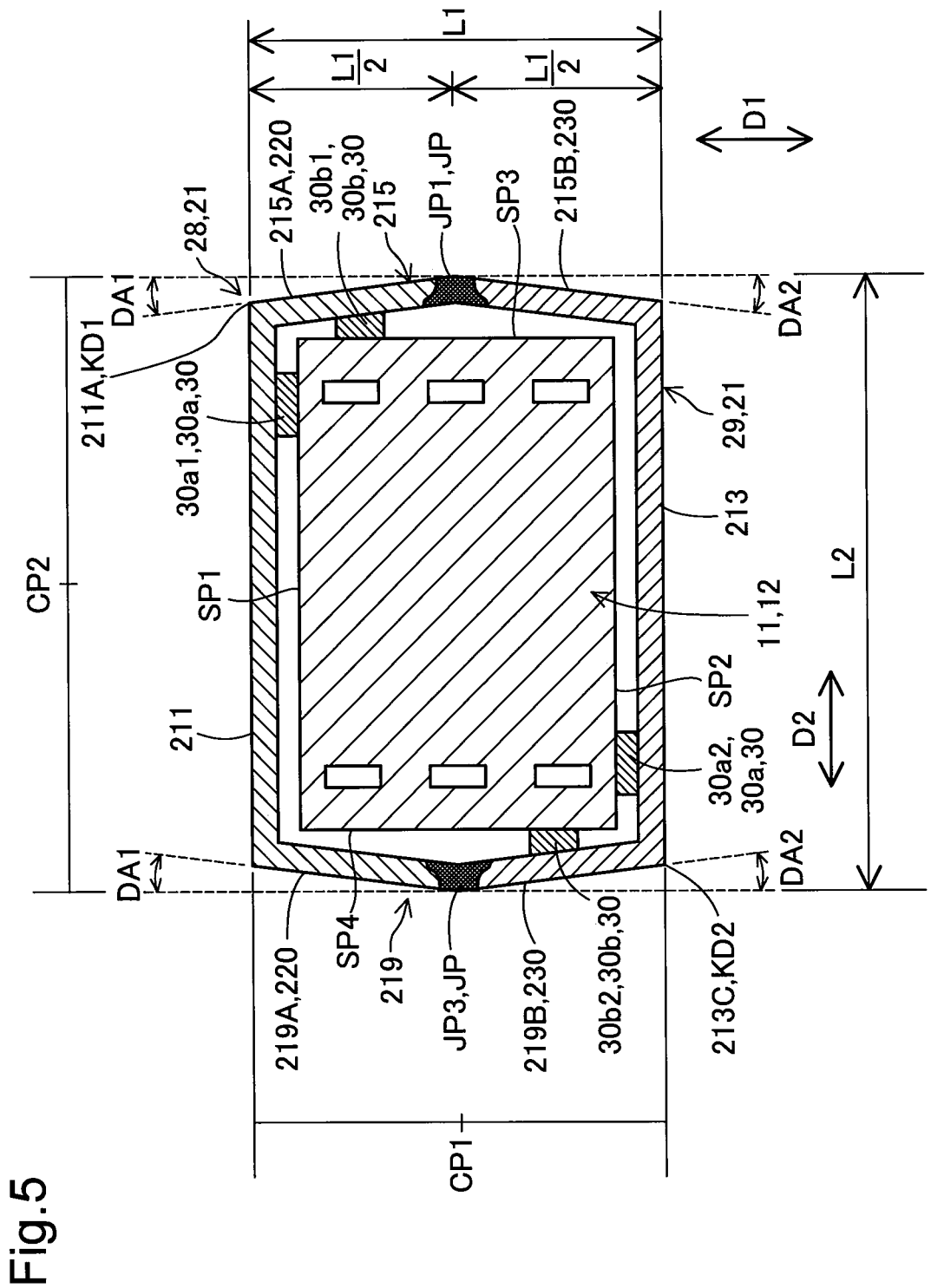
FIG. 5 is a sectional view taken on a line F3A-F3A in FIG. 3.

FIG. 2 is a diagram illustrating the cover member 25 when being viewed from one side in the stacking direction SD (from left side of the sheet surface of FIG. 1). FIG. 3 is a perspective view schematically illustrating the fuel cell 100. FIG. 4 is a perspective view schematically illustrating the case 21. FIG. 5 is a sectional view taken on a line F3-F3A shown in FIG. 3. In the description below, a direction that is orthogonal to both the stacking direction SD and the first direction D1 is called second direction D2. According to this embodiment, the first direction D1 corresponds to a height direction of the case 21, and the second direction D2 corresponds to a width direction of the case 21. The terminal plate 15 placed on the cover member 25-side is omitted from the illustration of FIG. 3. The cover member 25 (shown in FIG. 2) is formed in an outer shape corresponding to the outer shape of the end face 21E (shown in FIG. 3). The cover member 25 is configured to include the six connection ports 251 as described above.

The case 21 (shown in FIG. 3) is formed in an approximately rectangular parallelepiped appearance shape. With respect to the case 21, a length L1 denotes a length in the first direction D1, a length L2 denotes a length in the second direction D2, and a length L3 denotes a length in the stacking direction SD. The case 21 is configured to satisfy the relationship of length L3>length L2>length L1. In other words, the length L1 is the shortest among the lengths L1 to L3.

The case 21 (shown in FIGS. 3 and 4) is configured to include a case bottom wall 218 provided to form a bottom of the concave shape and first to fourth case side walls 211, 213, 215 and 219 arranged to rise from the circumference of the case bottom wall 218 and to be extended along the stacking direction SD. The case bottom wall 218 is arranged to be opposed to the second stacked body end side face SP6 across the terminal plate 15. The case bottom wall 218 forms an opposite end face that is opposite to the end face 21E across the cell stacked body 12 in the stacking direction SD. In other words, the case bottom wall 218 is located on one side in the stacking direction SD of the cell stacked body 12 (on the upper right side of the sheet surface of FIG. 3). A portion of the case bottom wall 218 where a joint portion JP is located is an outermost side of the case bottom wall 218 that is extended to the outermost side of the case 21 by two draft angles DA1 and DA2 described later. The case bottom wall 218 is arranged to intersect with the first to the fourth case side walls 211, 213, 215 and 219.

The first case side wall 211 and the second case side wall 213 are arranged to be opposed to each other across the cell stacked body 12. The first case side wall 211 and the second case side wall 213 are respectively extended along the stacking direction SD. The third case side wall 215 and the fourth case side wall 219 are arranged to intersect with the first case side wall 211 and the second case side wall 213. The third case side wall 215 and the fourth case side wall 219 are respectively extended along the stacking direction SD. The third case side wall 215 and the fourth case side wall 219 are arranged to be opposed to each other across the cell stacked body 12.

The respective lengths of the third case side wall 215 and the fourth case side wall 219 in the first direction D1 are equal to the length L1 of the case 21 in the first direction D1. In other words, the length L1 of the case 21 in the first direction D1 is equal to the total length in the first direction D1 of a first opposed side wall 215A and a second opposed side wall 215B that are joined with each other as described later and is equal to the total length in the first direction D1 of a first opposed side wall 219A and a second opposed side wall 219B that are joined with each other as described later. The respective lengths the first case side wall 211 and the second case side wall 213 in the second direction D2 are equal to the length L2 of the case 21 in the second direction D2. The first direction D1 is a direction that is orthogonal to the stacking direction SD and is a direction in which the first case side wall 211 and the second case side wall 213 are opposed to each other. The second direction D2 is a direction that is orthogonal to both the stacking direction SD and the first direction D1 and is a direction in which the third case side wall 215 and the fourth case side wall 219 are opposed to each other (i.e., in which a pair of first opposed side walls 215A and 219A described later are opposed to each other).

The first case side wall 211 is located on one side in the first direction D1 of the cell stacked body 12 (on the upper side of the sheet surface of FIG. 3). The first case side wall 211 is arranged to be opposed to the first stacked body side face SP1. The first case side wall 211 is provided as a flat plate formed in a rectangular outer shape and is configured to have no draft angles, unlike the third case side wall 215 and the fourth case side wall 219 described later.

The second case side wall 213 is located on the other side in the first direction D1 of the cell stacked body 12 (on the lower side of the sheet surface of FIG. 3). When the fuel cell 100 is mounted on the vehicle, the second case side wall 213 is arranged to form a bottom face of the case 21. The second case side wall 213 is arranged to be opposed to the second stacked body side face SP2. The second case side wall 213 is located on the opposite side to the first case side wall 211 across the cell stacked body 12 in the first direction D1. The second case side wall 213 is provided as a flat plate formed in a rectangular outer shape and is configured to have no draft angles, unlike the third case side wall 215 and the fourth case side wall 219 described later.

The third case side wall 215 is located on one side in the second direction D2 of the cell stacked body 12 (on the lower right side of the sheet surface of FIG. 3). The third case side wall 215 is arranged to be opposed to the third stacked body side face SP3. A portion of the third case side wall 215 where a joint portion JP is located is an outermost side of the third case side wall 215 that is extended to the outermost side of the case 21 by the two draft angles DA1 and DA2 described later.

The fourth case side wall 219 is located on the other side in the second direction D2 of the cell stacked body 12 (on the upper left side of the sheet surface of FIG. 3). The fourth case side wall 219 is arranged to be opposed to the fourth stacked body side face SP4. The fourth case side wall 219 is located on the opposite side to the third case side wall 215 across the cell stacked body 12 in the second direction D2. A portion of the fourth case side wall 219 where a joint portion JP is located is an outermost side of the fourth case side wall 219 that is extended to the outermost side of the case 21 by the two draft angles DA1 and DA2 described later.

The case 21 is configured to include a first case 28 and a second case 29. The case 21 is formed by joining the first case 28 with the second case 29. A portion where the first case 28 and the second case 29 are joined with each other is called joint portion JP. The first case 28 and the second case 29 are both casts.

The first case 28 (shown in FIGS. 3 and 4) is configured to include a first side wall 220 that is arranged to rise from circumferential edges 211A, 211B and 211C of the first case side wall 211 that is provided as a bottom wall. In the description below, the first case side wall 211 is also called first bottom wall 211 when the first case side wall 211 is regarded as a component of the first case 28.

The first bottom wall 211 is a flat plate-like member arranged parallel to the second direction D2 and parallel to the stacking direction SD. The first bottom wall 211 is located on one side in the first direction D1 of the cell stacked body 12. The first side wall 220 is arranged to rise from the first bottom wall 211 toward the other side in the first direction D1. The first side wall 220 is configured to have a draft angle DA1 that is extended to the outer side of the case 21 with an increase in distance away from the first bottom wall 211. The draft angle DA1 may be formed by molding the first case 28 using a mold such as to provide an inclination in a molded product in a mold-opening direction. The draft angle DA1 may be set, for example, in a range of not less than 0.5 degrees to not greater than 3.0 degrees. The first side wall 220 is configured to include a pair of first opposed side walls 215A and 219A and a first intersecting wall 218A arranged to intersect with the pair of first opposed side walls 215A and 219A.

The pair of first opposed side walls 215A and 219A (shown in FIGS. 3 and 4) are arranged to rise from the circumferential edges 211A and 211C on the respective sides in the second direction D2 of the first bottom wall 211 (first case side wall 211). One of the first opposed side walls 215A is arranged to rise from the circumferential edge 211A, whereas the other of the first opposed side walls 219A is arranged to rise from the circumferential edge 211C. The first intersecting wall 218A (shown in FIG. 4) is arranged to rise from the circumferential edge 211B on one side in the stacking direction SD of the first bottom wall 211. The first intersecting wall 218A is arranged to intersect with the pair of first opposed side walls 215A and 219A. The pair of first opposed side walls 215A and 219A are arranged to be opposed to each other across the cell stacked body 12 in the second direction D2.

The second case 29 (shown in FIGS. 3 and 4) is configured to include a second side wall 230 that is arranged to rise from circumferential edges 213A, 213B and 213C of the second case side wall 213 that is provided as a bottom wall, toward the first case 28. In the description below, the second case side wall 213 is also called second bottom wall 213 when the second case side wall 213 is regarded as a component of the second case 29.

The second bottom wall 213 is a flat plate-like member arranged parallel to the second direction D2 and parallel to the stacking direction SD. The second side wall 230 is configured to have a draft angle DA2 that is extended to the outer side of the case 21 with an increase in distance away from the second bottom wall 213. The draft angle DA2 may be formed by molding the second case 29 using a mold such as to provide an inclination in a molded product in a mold-opening direction. The draft angle DA2 may be set, for example, in a range of not less than 0.5 degrees to not greater than 3.0 degrees. According to this embodiment, an identical value is set to the draft angle DA1 and the draft angle DA2. The second side wall 230 is configured to include a pair of second opposed side walls 215B and 219B and a second intersecting wall 218B arranged to intersect with the pair of second opposed side walls 215B and 219B.

The pair of second opposed side walls 215B and 219B are arranged to rise from the circumferential edges 213A and 213C on the respective sides in the second direction D2 of the second bottom wall 213 (second case side wall 213). One of the second opposed side walls 215B is arranged to rise from the circumferential edge 213A, whereas the other of the second opposed side walls 219B is arranged to rise from the circumferential edge 213C. The second intersecting wall 218B (shown in FIG. 4) is arranged to rise from the circumferential edge 213B on one side in the stacking direction SD of the second bottom wall 213. The second intersecting wall 218B is arranged to intersect with the pair of second opposed side walls 215B and 219B. The pair of second opposed side walls 215B and 219B are arranged to be opposed to each other across the cell stacked body 12 in the second direction D2.

The third case side wall 215 is configured by one of the first opposed side walls 215A and one of the second opposed side walls 215B. The fourth case side wall 219 is configured by the other of the first opposed side walls 219A and the other of the second opposed side walls 219B. The case bottom wall 218 is configured by the first intersecting wall 218A and the second intersecting walls 218B. The case bottom wall 218 that is configured by the first intersecting wall 218A and the second intersecting wall 218B is arranged to intersect with the third case side wall 215 and the fourth case side wall 219 that are configured by the pair of first opposed side walls 215A and 219A and the pair of second opposed side walls 215B and 219B. The intersecting portions respectively form corners CR1 and CR2.

The joint portions JP include a pair of first joint portions JP1 and JP3 and a second joint portion JP2. The pair of first joint portions JP1 and JP3 are formed by arranging respective first edges 220E that are edges of the pair of first opposed side walls 215A and 219A on the opposite sides to their respective first bottom wall 211-sides, such as to abut with respective second edges 230E that are edges of the pair of second opposed side walls 215B and 219B on the opposite sides to their respective second bottom wall 213-sides and joining the respective first edges 220E with the respective second edges 230E by friction stir welding. The second joint portion JP2 (shown in FIG. 4) is formed by arranging a third edge 220Ea that is an edge of the first intersecting wall 218A on the opposite side to its first bottom wall 211-side, such as to abut with a fourth edge 230Ea that is an edge of the second intersecting wall 218B on the opposite side to its second bottom wall 213-side and joining the third edge 220Ea with the fourth edge 230Ea by friction stir welding. The pair of first joint portions JP1 and JP3 are linear joint portions extended over the respective ends in the stacking direction SD of the case 21. The second joint portion JP2 is configured to join the first intersecting wall 218A with the second intersecting wall 218B. The second joint portion JP2 is a linear joint portion extended over the respective ends in the second direction D2 of the case 21. The process of friction stir welding will be described later.

The joint portions JP (shown in FIG. 5) are formed at positions away from the first bottom wall 211 in the first direction D1 by a distance (L1/2). The respective lengths of the first side wall 220 and the second side wall 230 in the first direction D1 are thus half the length L1. In other words, the respective lengths of the first case 28 and the second case 29 in the first direction D1 that is the draft direction of the mold are equal to the length L1/2. According to another embodiment, each of the lengths in the first direction D1 of the pair of first opposed side walls 215A and 219A, the first intersecting wall 218A, the pair of second opposed side walls 215B and 219B and the second intersecting wall 218B may be not less than ⅓ and not greater than ⅔ of the length L1. In this latter case, the total length of the first side wall 220 and the second side wall 230 in the first direction D1 is also equal to the length L1.

The intervening layers 30 (shown in FIG. 5) include a pair of bottom wall intervening layers 30a and a pair of side wall intervening layers 30b. One of the pair of bottom wall intervening layers 30a (first bottom wall intervening layer 30a1) is placed between the first case side wall 211 and the first stacked body side face SP1 and is arranged to be in contact with the first case side wall 211 and with the first stacked body side face SP1. The other of the pair of bottom wall intervening layers 30a (second bottom wall intervening layer 30a2) is placed between the second case side wall 213 and the second stacked body side face SP2 and is arranged to be in contact with the second case side wall 213 and with the second stacked body side face SP2. The pair of bottom wall intervening layers 30a are arranged across a center CP2 of the case 21 in the second direction D2. More specifically, the first bottom wall intervening layer 30a1 is located on one side of the center CP2 of the case 21 in the second direction D2 (on the right side of the sheet surface of FIG. 5). The second bottom wall intervening layer 30a2 is located on the other side of the center CP2 of the case 21 in the second direction D2 (on the left side of the sheet surface of FIG. 5). The circumferential edge 211A forms one corner edge KD1 of the case 21 in the approximately rectangular shape when being viewed from a direction along the stacking direction SD. The circumferential edge 213C forms another corner edge KD2 of the case 21 located at the position diagonal to the corner edge KD1 of the case 21 in the approximately rectangular shape when being viewed from the direction along the stacking direction SD.

When an external force is applied to the case 21, the position near to the center of the case 21 (for example, the center CP2 of the case 21 in the second direction D2) has a larger amount of deformation of the case 21, compared with the corner edges forming the respective ends of the case 21 (for example, the corner edges KD1 and KD2). The configuration that the pair of bottom wall intervening layers 30a1 and 30a2 are arranged at the positions deviated from the center CP2 of the case 21 in the second direction D2 reduces the possibility that the conditions of the pair of bottom wall intervening layers 30a1 and 30a2 (for example, the state of contact with another member and the degree of compression) are changed by the deformation of the case 21, compared with the configuration that the pair of bottom wall intervening layers 30a1 and 30a2 are arranged at the center CP2 in the second direction D2. For example, even when the case 21 is expanded to the outer side of the case 21 to be away from the cell stacked body 12, this configuration reduces the possibility that the pair of bottom wall intervening layers 30a1 and 30a2 are separated from the walls of the case 21 (i.e., the first case side wall 211 and the second case side wall 213) and the side faces of the cell stacked body 12 (i.e., the first stacked body side face SP1 and the second stacked body side face SP2) and the possibility that the degree of compression of the bottom wall intervening layers 30a1 and 30a2 is changed. This configuration accordingly reduces the possibility that the pair of bottom wall intervening walls 30a1 and 30a2 fail to provide their functions (i.e., the vibration suppressing function and the position misalignment reducing function). According to a preferable configuration, the first bottom wall intervening layer 30a1 is arranged at a position near to the circumferential edge 211A that is located on one side of the center CP2 in the second direction D2, and the second bottom wall intervening layer 30a2 is arranged at a position near to the circumferential edge 213C that is located on the other side of the center CP2 in the second direction D2. This configuration further reduces the possibility that the conditions of the pair of bottom wall intervening layers 30a1 and 30a2 (for example, the state of contact with another member and the degree of compression) are changed by the deformation of the case 21.

One of the pair of side wall intervening layers 30b (first side wall intervening layer 30b1) is placed between the third case side wall 215 and the third stacked body side face SP3 and is arranged to be in contact with the third case side wall 215 and with the third stacked body side face SP3. The other of the pair of side wall intervening layers 30b (second side wall intervening layer 30b2) is placed between the fourth case side wall 219 and the fourth stacked body side face SP4 and is arranged to be in contact with the fourth case side wall 219 and with the fourth stacked body side face SP4. The pair of side wall intervening layers 30b are arranged across the portions where the first edges 220E and the second edges 230E are joined with each other (joint portions JP) in the first direction D1. According to this embodiment, the joint portions JP are located at a center CP1 of the case 21 in the first direction D1. Accordingly the first side wall intervening layer 30b1 is located on one side of the center CP1 in the first direction D1 where the first case side wall 211 is located (on the upper side of the sheet surface of FIG. 5). The second side wall intervening layer 30b2 is located on the other side of the center CP1 in the first direction D1 where the second case side wall 213 is located (on the lower side of the sheet surface of FIG. 5).

When an external force is applied to the case 21, the position near to the center of the case 21 (for example, the center CP1 of the case 21 in the first direction D1) has a larger amount of deformation of the case 21, compared with the corner edges forming the respective ends of the case 21 (for example, the corner edges KD1 and KD2). The configuration that the pair of side wall intervening layers 30b1 and 30b2 are arranged at the positions deviated from the center CP1 of the case 21 in the first direction D1 reduces the possibility that the conditions of the pair of side wall intervening layers 30b1 and 30b2 (for example, the state of contact with another member and the degree of compression) are changed by the deformation of the case 21, compared with the configuration that the pair of side wall intervening layers 30b1 and 30b2 are arranged at the center CP1 in the first direction D1. For example, even when the case 21 is expanded to the outer side of the case 21 to be away from the cell stacked body 12, this configuration reduces the possibility that the pair of side wall intervening layers 30b1 and 30b2 are separated from the walls of the case 21 (i.e., the third case side wall 215 and the fourth case side wall 219) and the side faces of the cell stacked body 12 (i.e., the third stacked body side face SP3 and the fourth stacked body side face SP4) and the possibility that the degree of compression of the side wall intervening layers 30b1 and 30b2 is changed. This configuration accordingly reduces the possibility that the pair of side wall intervening walls 30b1 and 30b2 fail to provide their functions (i.e., the vibration suppressing function and the position misalignment reducing function). According to a preferable configuration, the first side wall intervening layer 30b1 is arranged at a position near to the first case side wall 211 that is located on one side of the center CP1 in the first direction D1, and the second side wall intervening layer 30b2 is arranged at a position near to the second case side wall 213 that is located on the other side of the center CP1 in the first direction D1. This configuration further reduces the possibility that the conditions of the pair of side wall intervening layers 30b1 and 30b2 (for example, the state of contact with another member and the degree of compression) are changed by the deformation of the case 21.

A-2. Manufacturing Method of Fuel Cell 100

Figure 6:
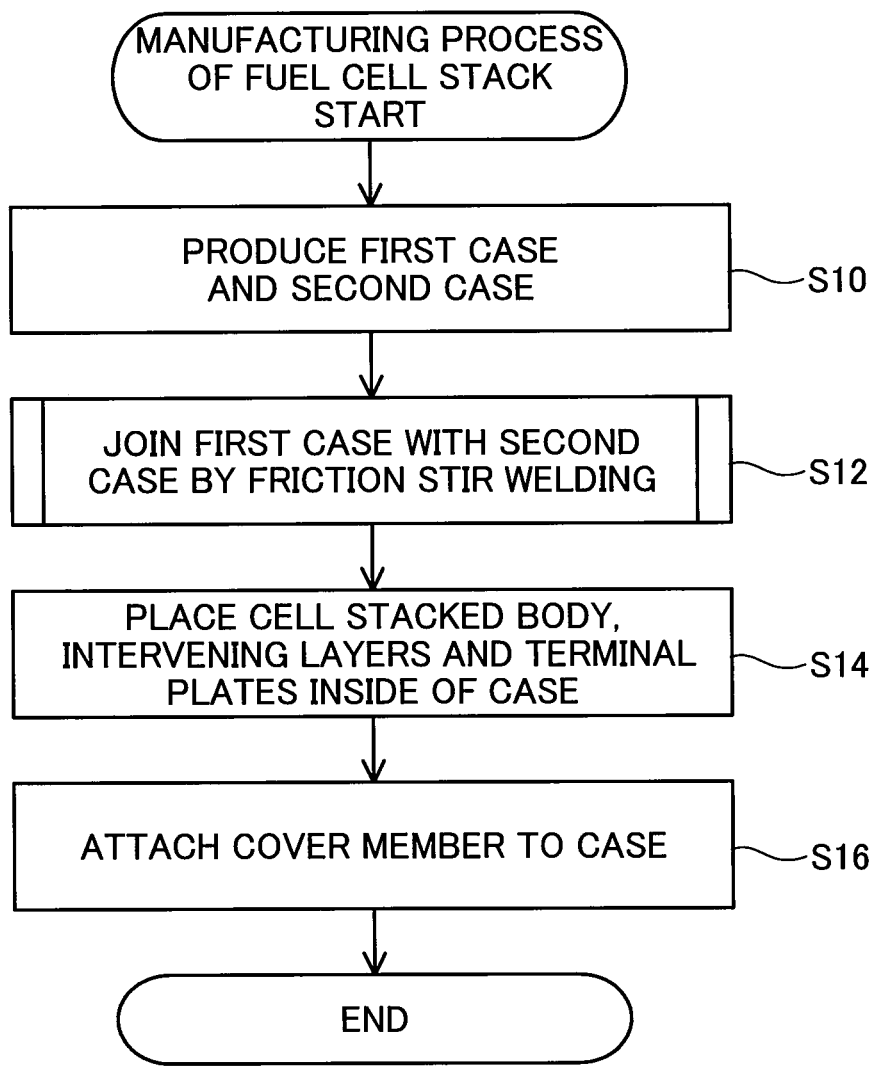
FIG. 6 is a flowchart showing a manufacturing process of the fuel cell.
Figure 7:
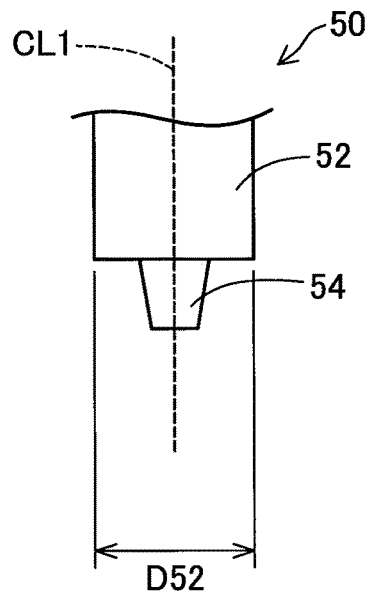
FIG. 7 is a diagram illustrating a first tool used in one process of the manufacturing process.

FIG. 6 is a flowchart showing a manufacturing process of the fuel cell 100. FIG. 7 is a diagram illustrating a first tool 50 used in one process of the manufacturing process.

The manufacturing process of the fuel cell 100 first produces the first case 28 and the second case 20 (step S10). The first case 28 and the second case 29 are respectively produced by pouring a heated metal (aluminum according to this embodiment) into respective molds, cooling down molded metal products and removing the cooled molded metal products from the molds.

The manufacturing process subsequently joins the first case 28 with the second case 20 by friction stir welding (step S12). More specifically, the first edge 220E of the first case 28 is arranged to abut with the second edge 230E of the second case 29, and the third edge 220Ea of the first case 28 is arranged to abut with the fourth edge 220Eb of the second case 29. The respective abutment portions that form the joint portions JP are then joined by friction stir welding. The case 21 is produced by joining the first case 28 with the second case 29. The first tool 50 shown in FIG. 7 is used for friction stir welding.

The first tool 50 (shown in FIG. 7) includes a first shoulder portion 52 in a columnar shape and a first pin 54 that is protruded from an end surface of the first shoulder portion 52. The first pin 54 is in a truncated cone shape. The first pin 54 is a portion that is rotated about an axis line CL1 to be pressed into the abutment portion forming the joint portion JP. The first shoulder portion 52 is rotated about the axis line CL1 while being pressed against the surfaces of the first case 28 and the second case 29. The first shoulder portion 52 is formed to have a diameter D52. The first tool 50 is configured such that the abutment portion forming the joint portion JP is softened by friction heat between the first pin 54 and members to be joined (i.e., the first case 28 and the second case 29) and that the abutment portion is kneaded as a plastic flow by rotation of the first shoulder portion 52. This forms the joint portion JP to join the first case 28 with the second case 29. The details of step S12 using the first tool 50 will be described later.

Referring back to FIG. 6, after the process of step S12, the manufacturing process places the cell stacked body 12, the intervening layers 30 and the terminal plates 15 inside of the case 21 (step S14). More specifically, the intervening layers 30 are inserted through the opening OP into the case 21 and are mounted to the inner surfaces of the case 21 by means of an adhesive or the like. The cell stacked body 12 and the terminal plates 15 are subsequently inserted through the opening OP along the stacking direction SD into the case 21 and are placed inside of the case 21. According to a modification, the intervening layers 30 may be placed in advance on the stacked body side faces SP1 to SP4 of the cell stacked body 12 and may be subsequently inserted along with the cell stacked body 12 into the case 21.

After step S14, the manufacturing process attaches the cover member 25 to the case 21 (step S16). More specifically, the cover member 25 is attached to the end face 21E by means of bolts or the like, such as to close the opening OP of the case 21. This manufactures the fuel cell 100.

Figure 8:
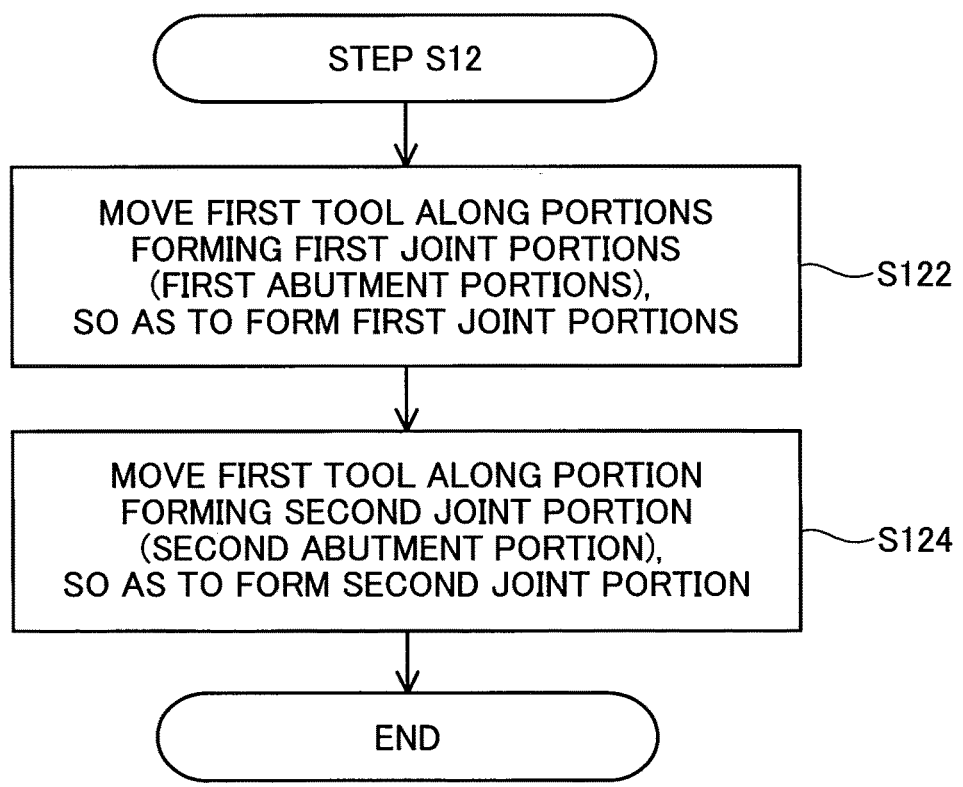
FIG. 8 is a flowchart showing the details of the process of step S12.
Figure 9:
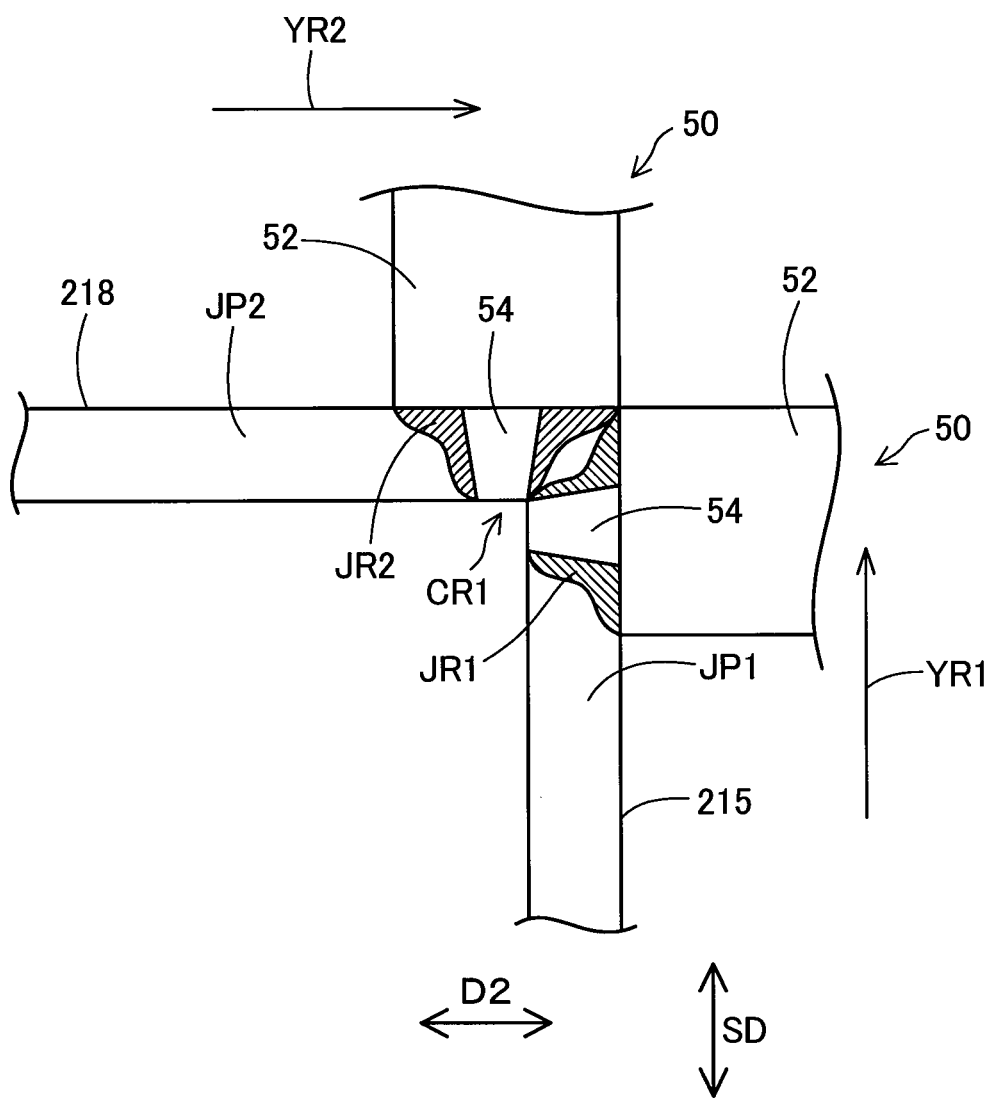
FIG. 9 is a diagram illustrating a process of friction stir welding at a corner.

FIG. 8 is a flowchart showing the details of the process of step S12. FIG. 9 is a diagram illustrating a process of friction stir welding at the corner CR1.

In the process of step S12, the first tool 50 is moved along the portion forming the first joint portion JP1 or JP3 (i.e., first abutment portion), so as to form the first joint portion JP1 or JP3 (shown in FIG. 4) (step S122). More specifically, for example, the first tool 50 is moved in the direction of an arrow YR1 from the end face 21E-side toward the case bottom wall 218-side that is parallel to the stacking direction SD, so as to form one first joint portion JP1 of the pair of first joint portions JP1 and JP3 (shown in FIG. 9). The first tool 50 is subsequently moved in the direction of the arrow YR1, so as to form the other first joint portion JP3 of the pair of first joint portions JP1 and JP3. In the joining process using the first tool 50, while the end surface of the first shoulder portion 52 is pressed against the abutment portion of the first edge 220E and the second edge 230E that forms the first joint portion JP1 or JP3, the first pin 54 is pressed into the abutment portion. In the state that the first pin 54 is pressed in the abutment portion, the first tool 50 is rotated about the axis line CL1 and is moved along the abutment portion. The sequence of formation of the pair of first joint portions JP1 and JP3 is not limited to the above description, but the other first joint portion JP3 may be formed prior to one first joint portion JP1.

The first tool 50 is also moved along the portion forming the second joint portion JP2 (i.e., second abutment portion), so as to form the second joint portion JP2 (shown in FIG. 4) (step S124). More specifically, for example, the first tool 50 is moved in the direction of an arrow YR2 from the corner CR2 toward the corner CR1 that is parallel to the direction D2, so as to form the second joint portion JP2 (shown in FIG. 9). In FIG. 9, a joint area JR1 of the first joint portion JP1 formed at the corner CR1 is shown by single hatching, and a joint area JR2 of the second joint portion JP2 formed at the corner CR1 is shown by different single hatching that is different from the single hatching of the joint area JR1. The sequence of the processes of step S122 and step S124 is not limited to the description of this embodiment, but the process of step S124 may be performed prior to the process of step S122. According to another modification, the second joint portion JP2 may be formed after formation of one of the pair of first joint portions JP1 and JP3, and the other of the pair of first joint portions JP1 and JP3 may be formed after formation of the second joint portion JP2.

A-3. Comparative Examples

Figure 10:
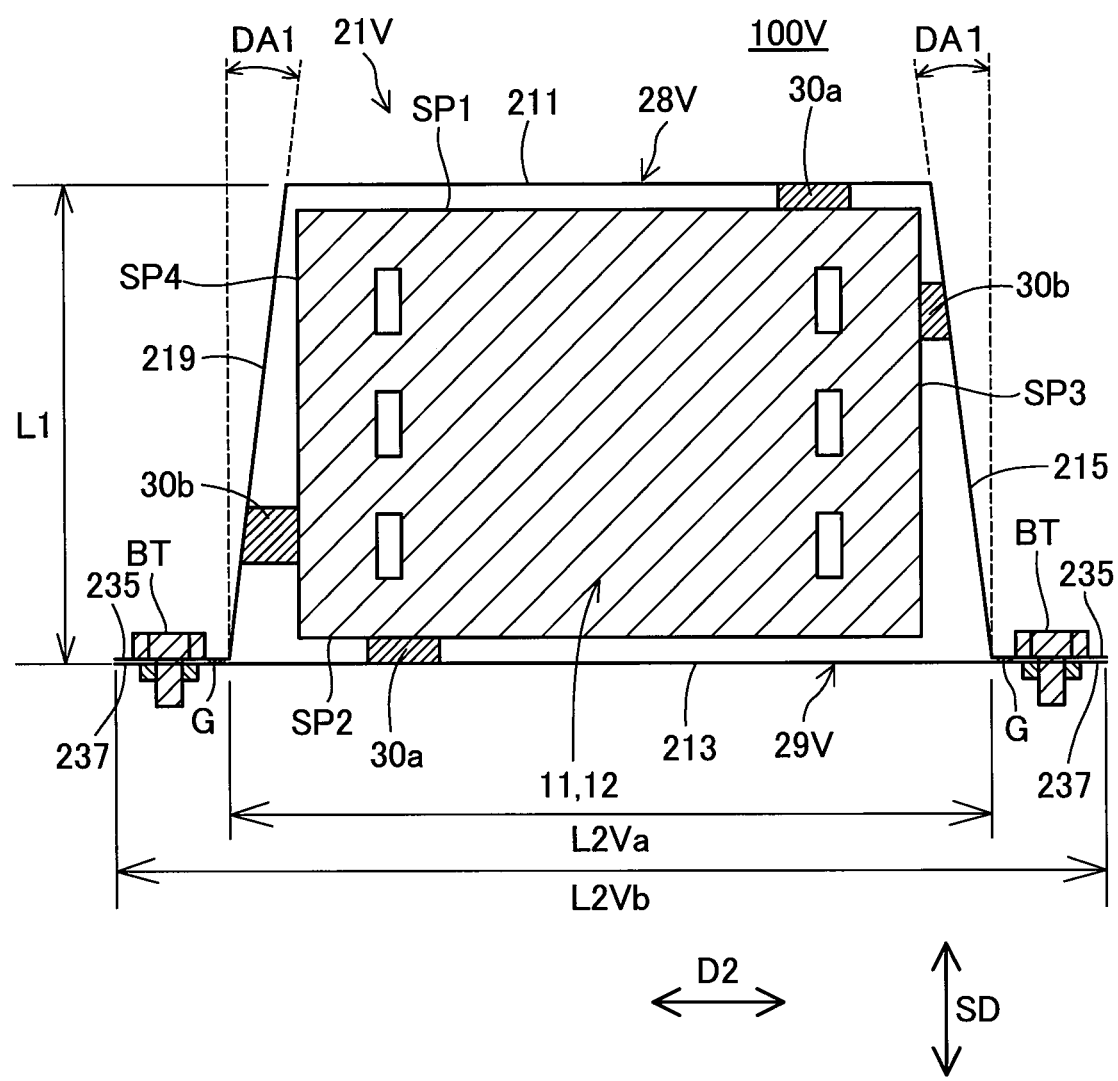
FIG. 10 is a diagram illustrating a fuel cell according to a first comparative example.

FIG. 10 is a diagram illustrating a fuel cell 100V according to a first comparative example. The diagram of FIG. 10 is comparable to the diagram of FIG. 5. A first case 28V and a second case 29V shown in FIG. 10 have predetermined thicknesses like the first case 28 and the second case 29 shown in FIG. 5, although these thicknesses are omitted from the illustration of FIG. 10. The fuel cell 100V differs from the fuel cell 100 (shown in FIG. 5) mainly by the configuration of a case 21V. Otherwise the configuration of the fuel cell 100V is similar to the configuration of the fuel cell 100. The like components to those of the fuel cell 100 are expressed by the like reference signs and are not specifically described.

The case 21V of the fuel cell 100V is configured to include the first case 28V and the second case 29V. The second case 29V is a flat plate-like member and is configured to form a second case side wall 213. The first case 28V is configured to include side walls that are arranged to rise from a first case side wall 211 and form a third case side wall 215, a fourth case side wall 219 and a case bottom wall 218 (not shown). Accordingly the case 21V is configured such that the third case side wall 215, the fourth case side wall 219 and the case bottom wall 218 are not formed by the first case 28V and the second case 29V but are formed by only the first case 28V. Like the first case 28, the first case 28V is configured to have a draft angle DA1 that is extended to the outer side of the case 21V with an increase in distance away from the first bottom wall 211. The draft angle of the first case 28V is identical with the draft angle of the first case 28. The length in the second direction D2 of the first bottom wall 211 in the case 21V is also identical with the length in the case 21.

The first case 28V of the case 21V is configured to have a length in the draft direction (first direction D1) that is greater than the length L1/2 of the first case 28. Even when the draft angle DA1 of the first case 28V is equal to the draft angle DA1 of the first case 28, this configuration causes an opposite end of the first case 28V that is opposite to the first bottom wall 211-side to be extended more to the outer side of the case 21V, compared with the opposite end of the first case 28 (i.e., the first edges 220E and the third edge 220Ea). This configuration accordingly causes a length L2Va of the case 21V in the second direction D2 to be longer than the length L2 of the case 21 in the second direction D2 (as shown in FIG. 5). The case bottom wall 218 of the case 21V is also extended more to the outer side, compared with the bottom wall 218 of the case 21. This configuration causes a length of the case 21V in the stacking direction SD to be longer than the length L3 of the case 21 in the stacking direction SD (as shown in FIG. 3). Accordingly the case 21V of the comparative example has the larger dimensions in the second direction D2 and the stacking direction SD, compared the case 21 of the embodiment.

A flange 235 that is extended to the outer side of the case 21V is formed on the opposite end of the first case 28V that is opposite to the first bottom wall 211-side. The flange 235 is clamped to a flange 237 of the second case 29V by means of bolts BT. The flanges 235 and 237 are also provided on the case bottom wall 218-side. A gasket G is placed between the two flanges 235 and 237 on the inner side of the bolt BT in the case 21V. As described above, the case 21V has the flanges 235 and 237 used to clamp the first case 28V and the second case 29V to each other by means of the bolts BT. This configuration causes a length L2Vb in the second direction D2 of the case 21V to be further longer than the length L2 in the second direction D2 of the case 21. The presence of the flanges 235 and 237 also causes the length of the case 21V in the stacking direction SD to be further longer than the length L3 of the case 21 in the stacking direction SD. Additionally, the gaskets G are required to ensure the sealing properties inside of the case 21V.

Figure 11:
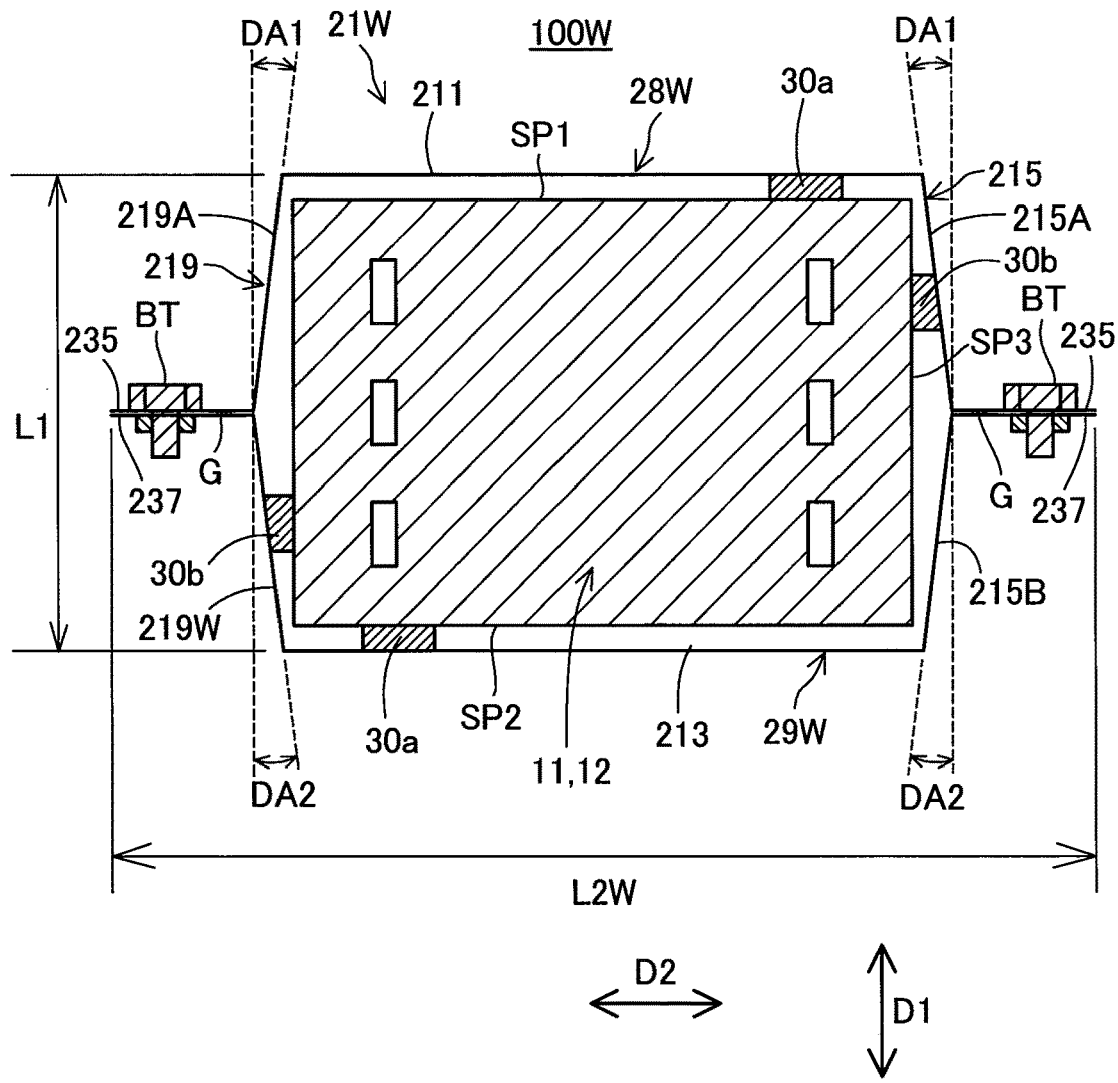
FIG. 11 is a diagram illustrating a fuel cell according to a second comparative example.

FIG. 11 is a diagram illustrating a fuel cell 100W according to a second comparative example. The diagram of FIG. 11 is comparable to the diagram of FIG. 5. A first case 28W and a second case 29W shown in FIG. 11 have predetermined thicknesses like the first case 28 and the second case 29 shown in FIG. 5, although these thicknesses are omitted from the illustration of FIG. 11. The fuel cell 100W differs from the fuel cell 100 (shown in FIG. 5) mainly by the configuration that the first case 28W and the second case 29W respectively have flanges 235 and 237 and that a case 21W is manufactured by clamping the flanges 235 and 237 to each other by means of bolts BT. Otherwise the configuration of the fuel cell 100W is similar to the configuration of the fuel cell 100. The like components to those of the fuel cell 100 are expressed by the like reference signs and are not specifically described.

The case 21W of the fuel cell 100W shown in FIG. 11 has a length L2W in the second direction D2 that is longer than the length L2 of the case 21 in the second direction D2 by the presence of the flanges 235 and 237. Similarly the case 21W has a length in the stacking direction SD that is longer than the length L3 of the case 21 in the stacking direction SD by the presence of the flanges 235 and 237. Additionally, the gaskets G are required to ensure the sealing properties inside of the case 21W.

A-4. Advantageous Effects

According to the above embodiment, the first side wall 220 having the draft angle DA1 is joined with the second side wall 230 having the draft angle DA2 (as shown in FIG. 5). This configuration suppresses size expansion of the case 21 due to the draft angles DA1 and DA2, compared with the configuration of the case 21V (shown in FIG. 10) formed by attaching the plate to the concave member having the draft angle DA1. The configuration of this embodiment suppresses size expansion of the case 21 in the second direction D2 and in the stacking direction SD. The draft angles DA1 and DA2 are provided on the first side wall 220 and the second side wall 230 that define the length L1 in the shortest length direction (first direction D1) of the case 21 (as shown in FIG. 5). This configuration further suppresses size expansion of the case 21 due to the draft angles DA1 and DA2. As shown in FIG. 11, in the configuration that the first case 28W and the second case 29W are fixed to each other by means of clamping members such as the bolts BT, there is a need to provide the flanges 235 and 237 for the clamping members in the first case 28W and the second case 29W. According to the above embodiment, on the other hand, the case 21 is formed by joining the first edges 220E with the second edges 230E. This configuration does not need to provide the flanges 235 and 237, unlike the configuration that the first case 28 and the second case 29 are fixed to each other by means of the clamping members such as the bolts BT. This configuration furthermore suppresses size expansion of the case 21. The configuration of the above embodiment also includes the intervening layers 30 arranged to be in contact with the case 21 and with the stacked body side faces SP1 to SP4 (as shown in FIG. 5). Even when an external force such as vibration is applied to the cell stacked body 12, this configuration suppresses the cell stacked body 12 from hitting against the case 21 and thereby reduces the possibility that the cell stacked body 12 is damaged or deformed. In the configuration of the above embodiment, the intervening layers 30 are arranged to be in contact with the case 21 and with the stacked body side faces SP1 to SP4 over the stacking direction SD. This configuration suppresses a position misalignment of the respective unit cells 11 in the direction orthogonal to the stacking direction SD. The configuration of suppressing the position misalignment of the respective unit cells 11 only requires that the clearances where the intervening layers 30 are to be placed are provided in the case 21 without taking into account the position misalignment. This furthermore effectively suppresses size expansion of the case 21.

According to the above embodiment, the first side wall 220 having the draft angle DA1 and the second side wall 230 having the draft angle DA2 are configured to respectively have the length (L1/2) in the first direction D1 that is half the length L1 of the case 21 in the first direction D1 (as shown in FIG. 5). This configuration minimizes expansion of the first side wall 220 and the second side wall 230 to the outer side of the case 21 by the draft angles DA1 and DA2. According to a modification, each of the first side wall 220 and the second side wall 230 may be configured to have a length in the first direction D1 that is not less than ⅓ and not greater than ⅔ of the length L1. This configuration suppresses size expansion of the case 21 due to the draft angles DA1 and DA2, compared with the configuration of the case 21 including the first side wall 220 and the second side wall 230 having the lengths out of this range.

According to the above embodiment, the first case 28 and the second case 29 are joined with each other by friction stir welding (as shown in FIG. 6). Friction stir welding generally enables target members to be joined with each other in the lower temperature condition of the target members (i.e., the temperature condition of the target members that is lower than the melting point of the target members), compared with laser welding. This configuration reduces the possibility that the first case 28 and the second case 29 are deformed by heat. According to the above embodiment, it is preferable that each of the draft angles DA1 and DA2 is in the range of not less than 0.5 degrees to not greater than 1.5 degrees. This configuration causes the angle (=180 degrees−DA2−DA2) of the portion where the first case 28 and the second case 29 abut with each other (abutment portion) to become closer to 180 degrees. In other words, this configuration causes the abutment portion to be closer to the flat plate-like form. This configuration accordingly reduces the possibility that the abutment portion is scraped and thinned by the first shoulder portion 52 of the first tool 50. When the draft angles DA1 and DA2 are less than 0.5 degrees, there is a high possibility that dents (sinks) occur on the surfaces of and voids occur inside of the first case 28 and the second case 29. From a quality standpoint of the case 21, it is thus preferable that the draft angles DA1 and DA2 are not less than 0.5 degrees.

B. Modifications of Joining Process Using Friction Stir Welding

According to the embodiment described above, the joint portions JP are formed using the first tool 50 having the diameter D52 (shown in FIG. 7). This process is, however, not restrictive. For example, the joint portions JP may be formed using two different tools having different diameters. The following describes a modification that forms the joint portions JP using two different tools.

Figure 12:
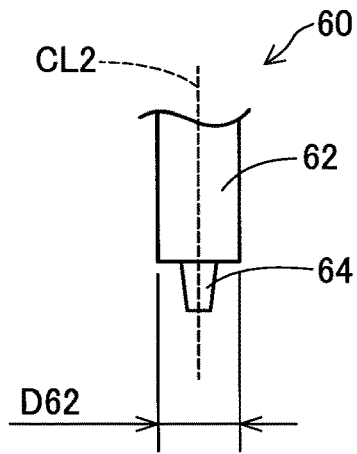
FIG. 12 is a diagram illustrating a second tool.
Figure 13:
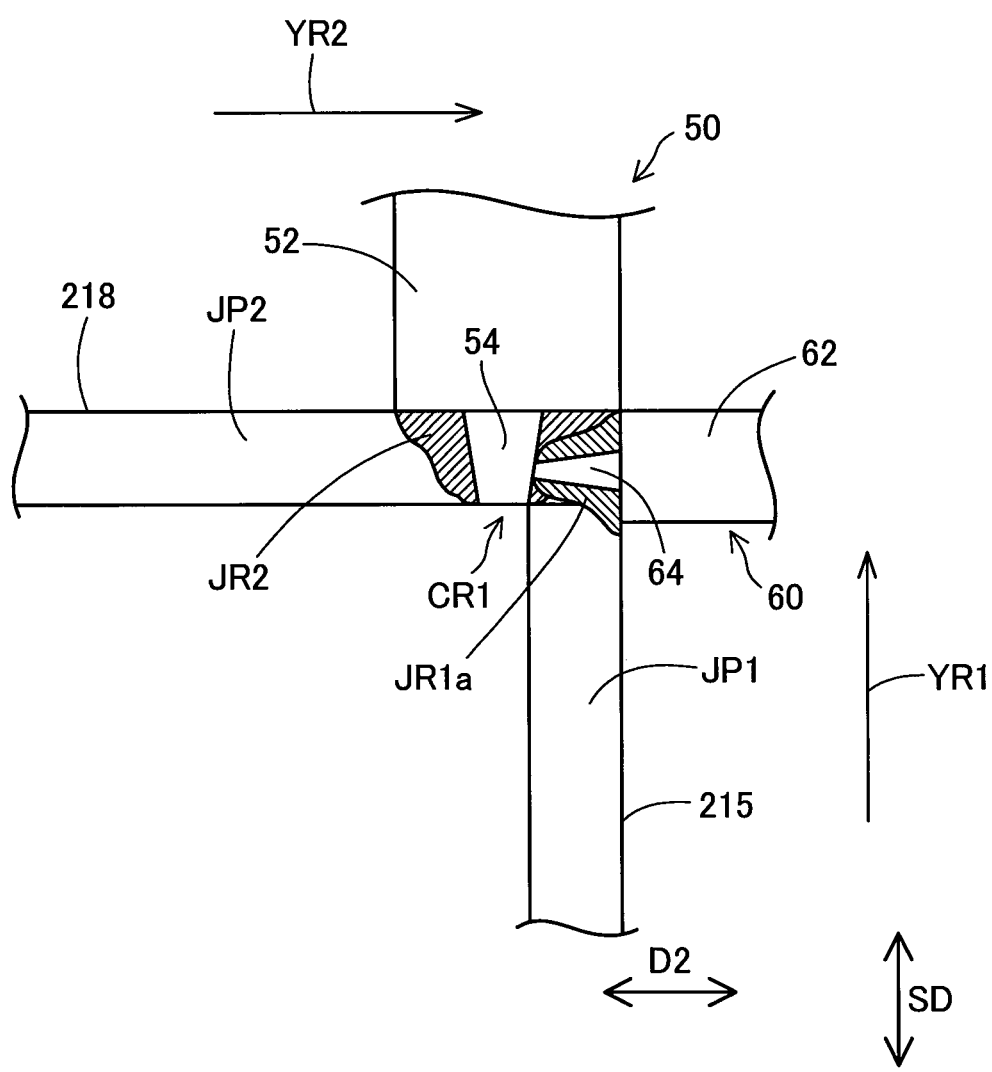
FIG. 13 is a diagram illustrating a process of friction stir welding at a corner.
Figure 14:
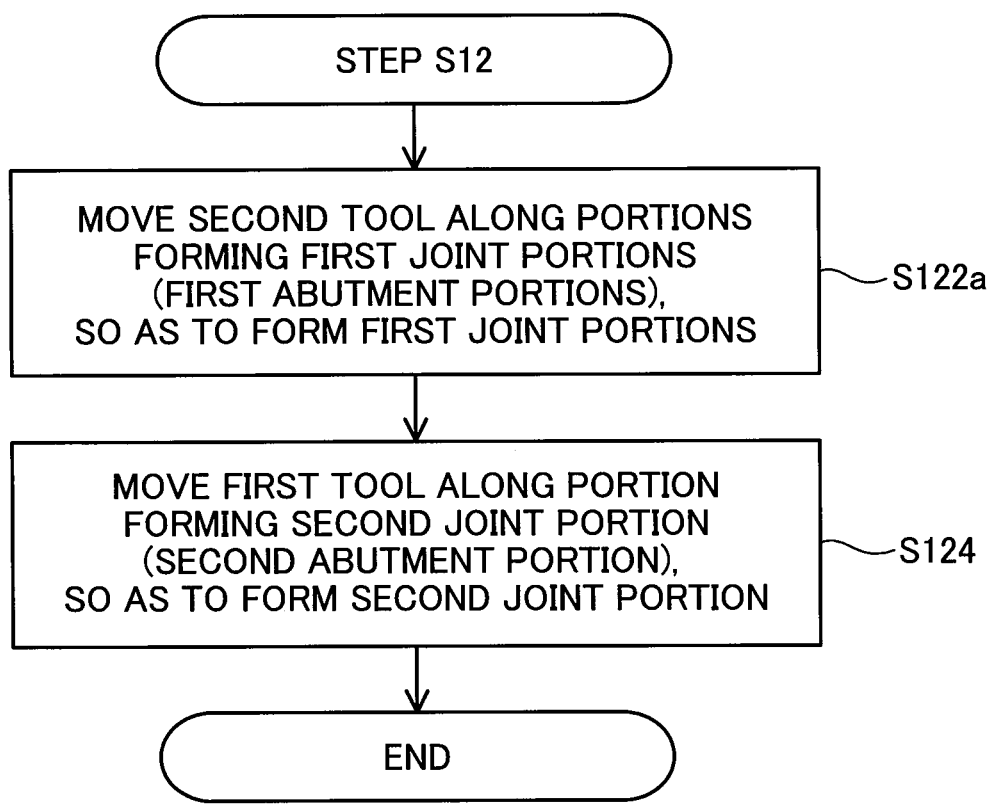
FIG. 14 is a flowchart showing the details of the process of step S12 according to a modification.

FIG. 12 is a diagram illustrating a second tool 60. FIG. 13 is a diagram illustrating a process of friction stir welding at the corner CR1. The diagram of FIG. 13 is comparable to the diagram of FIG. 9. FIG. 14 is a flowchart showing the details of the process of step S12 according to a modification.

As shown in FIG. 12, the second tool 60 includes a second shoulder portion 62 in a columnar shape and a second pint 64 that is protruded from an end surface of the second shoulder portion 62. The second pin 64 is in a truncated cone shape. The second pin 64 and the second shoulder portion 62 are respectively rotated about an axis line CL2 to form the joint portion JP. The functions of the second pin 64 and the second shoulder portion 62 are similar to the functions of the first pin 54 and the first shoulder portion 52 of the first tool 50. The second shoulder portion 62 is configured to have a diameter D62 that is smaller than the diameter D52 of the first shoulder portion 52.

According to this modification, the second tool 60 is used in place of the first tool 50 at step S122a. Accordingly the second tool 60 is moved along the portion forming the first joint portion JP1 or JP3 (first abutment portion), so as to form the first joint portion JP1 or JP3 (step S122a). More specifically, for example, as shown in FIG. 13, the second tool 60 is moved in the direction of an arrow YR1 from the end face 21E-side toward the case bottom wall 218-side that is parallel to the stacking direction SD, so as to form one first joint portion JP1 of the pair of first joint portions JP1 and JP3. The second tool 60 is subsequently moved in the direction of the arrow YR1, so as to form the other first joint portion JP3 of the pair of first joint portions JP1 and JP3. A region that is joined at the corner CR1 by the second tool 60 is called a joint area JR1a.

The process of step S12 according to this modification includes the process of forming the second joint portion JP2 using the first tool 50 (step S124 in FIG. 14) and the process of forming the first joint portions JP1 and JP3 using the second tool 60 including the second shoulder portion 62 having the smaller diameter than that of the first shoulder portion 52 (step S122a in FIG. 14). At step S124, while the end surface of the first shoulder portion 52 is pressed against the abutment portion of the third edge 220Ea and the fourth edge 230Ea, the first pin 54 is pressed into the abutment portion. In the state that the first pin 54 is pressed in the abutment portion, the first tool 50 is rotated about the axis line CL1 and is moved along the abutment portion including the corners CR1 and CR2. This forms the second joint portion JP2. At step S122a, while the end surface of the second shoulder portion 62 is pressed against the abutment portion of the first edge 220E and the second edge 230E, the second pin 64 is pressed into the abutment portion. In the state that the second pin 64 is pressed in the abutment portion, the second tool 60 is rotated about the axis line CL2 of the second tool 60 and is moved along the abutment portion including the CR1 or the corner CR2. This forms the first joint portions JP1 and JP3. This configuration enables the second tool 60 having the smaller diameter to be moved to the position nearer to the corner CR1 or the corner CR2 (to the position on the upper side of the sheet surface in FIG. 13) and form the corner CR1 or CR2. This accordingly enables the joint area JR1a to be overlapped with the joint area JR2. This reduces the possibility that a non-joint region appears at the corner CR1 or at the corner CR2.

C. Modifications of Arrangement of Intervening Layers 30

According to the above embodiment, the pair of side wall intervening layers 30*b* are arranged at the positions across the joint portions JP (center CP1) in the first direction D1 (as shown in FIG. 5). This configuration is, however, not restrictive. For example, two pairs of side wall intervening layers 30*b* may be provided. Two side wall intervening layers 30*b* on the third stacked body side face SP3-side may be arranged at positions across the joint portions JP (center CP1) in the first direction D1. Similarly two side wall intervening layers 30*b* on the fourth stacked body side face SP4-side may be arranged at positions across the joint portions JP (center CP1) in the first direction D1. The following describes other modifications of the pair of side wall intervening layers 30*b*.

Figure 15:
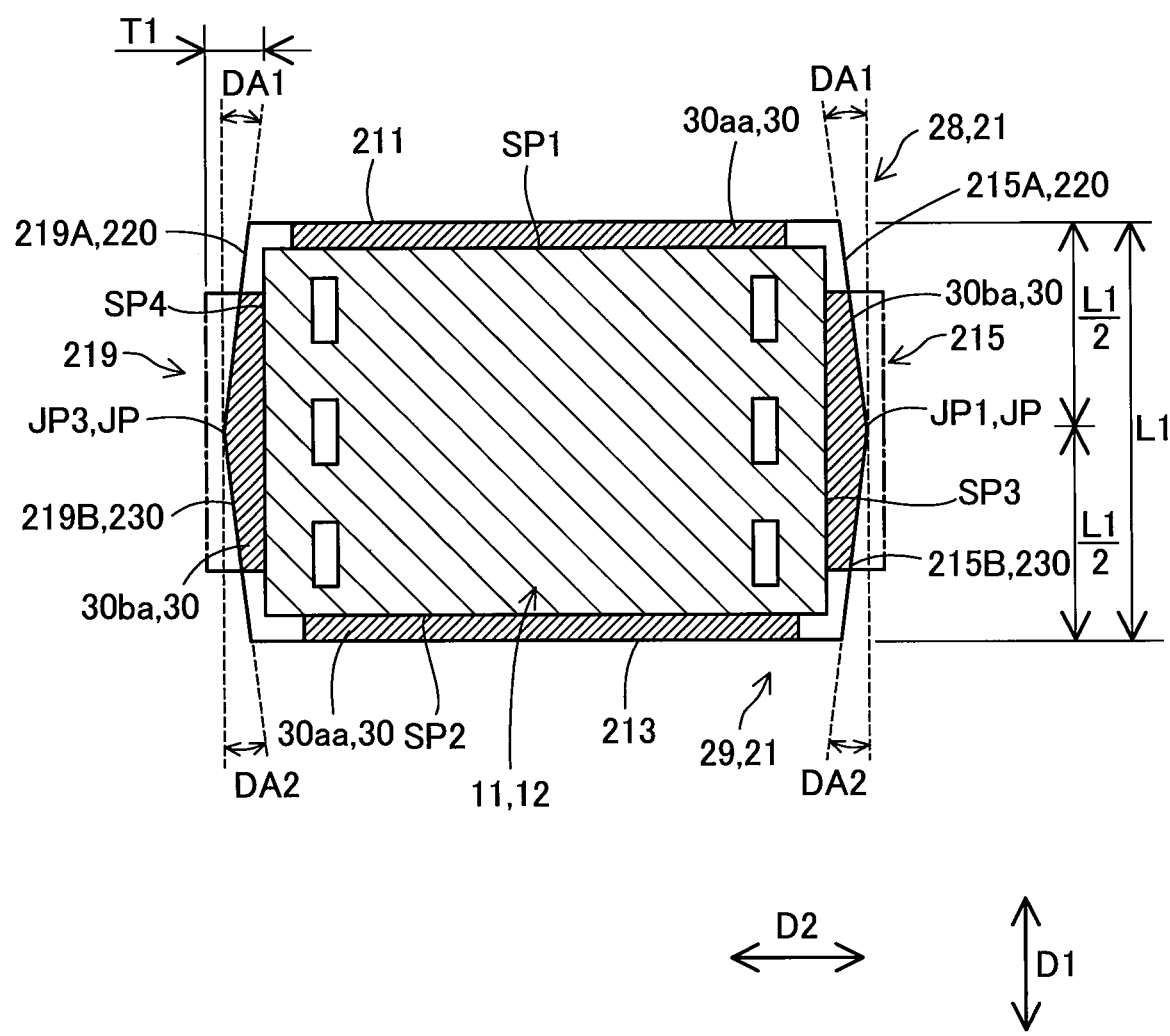
FIG. 15 is a diagram illustrating a pair of side wall intervening layers according to another modification.

FIG. 15 is a diagram illustrating a pair of side wall intervening layers 30*ba* according to another modification. The diagram of FIG. 15 is comparable to the diagram of FIG. 5. The pair of side wall intervening layers 30*ba* may be respectively arranged over the respective joint portions JP in the first direction D1 (i.e., over the center of the case 21 in the first direction D1. Similarly a pair of bottom wall intervening layers 30*aa* may be respectively arranged over the center of the cell stacked body 12 in the second direction D2. The configuration of this modification more effectively suppresses the vibration occurring in the cell stacked body 12 and also more effectively suppresses a position misalignment of the respective unit cells 11 in the direction orthogonal to the stacking direction SD. The pair of side wall intervening layers 30*ba* and the pair of bottom wall intervening layers 30*aa* are respectively placed in the case 21 in the state compressed by the stacked body side faces SP1 to SP4 and the case 21. The thickness directions of the side wall intervening layers 30*ba* and the bottom wall intervening layers 30*aa* are the directions in which the case 21 and the cell stacked body 12 are opposed to each other. More specifically, the thickness direction of the side wall intervening layers 30*ba* is the second direction D2, and the thickness direction of the bottom wall intervening layers 30*aa* is the first direction D1. In the non-compressed state of the pair of side wall intervening layer 30*ba* (i.e., in the state shown by the one-dot chain line), the pair of side wall intervening layers 30*ba* respectively have a thickness T1. The thickness T1 is greater than the interval between the third case side wall 215 and the third stacked body side face SP3 and is greater than the interval between the fourth case side wall 219 and the fourth stacked body side face SP4. The configuration of this modification provides the advantageous effects described below.

Figure 16:
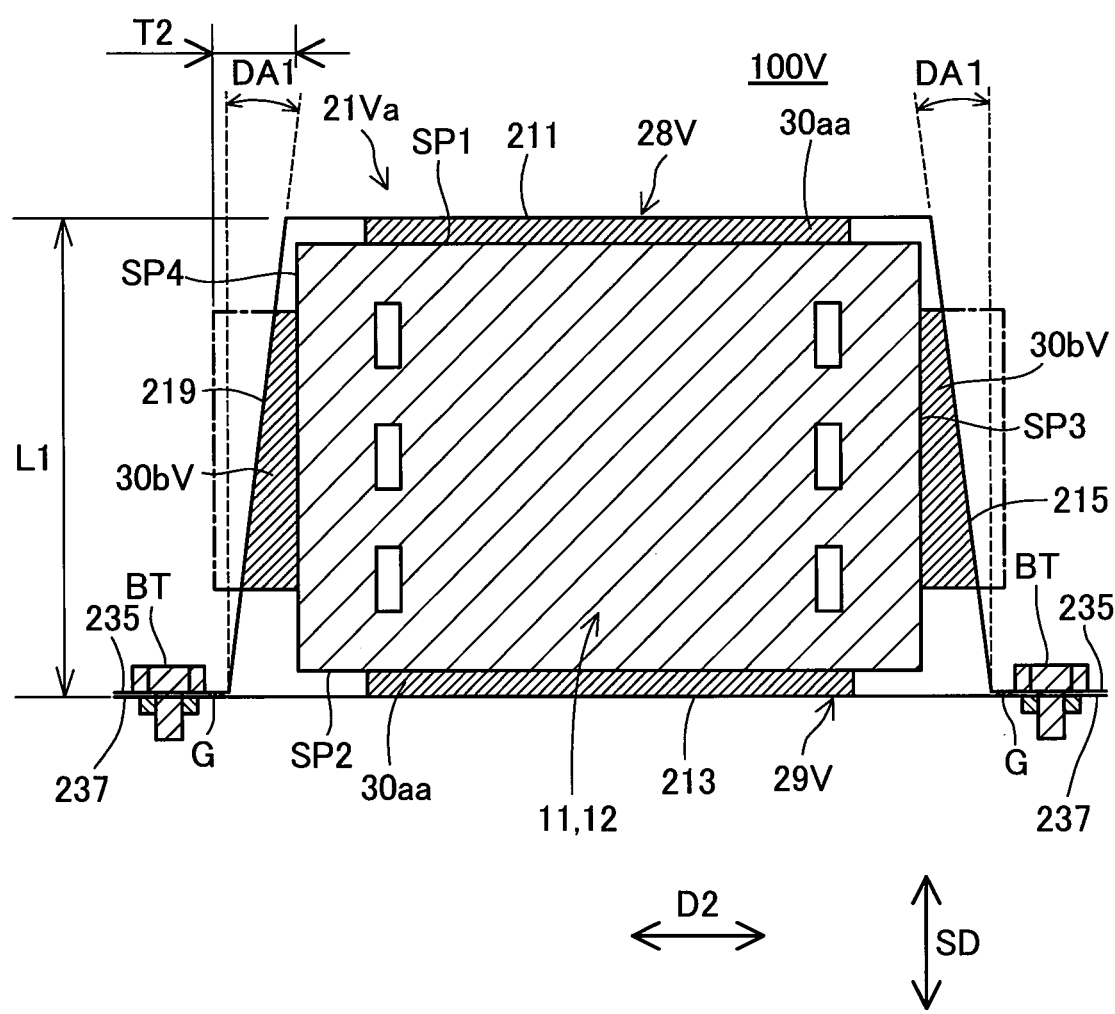
FIG. 16 is a diagram illustrating a comparative example for the purpose of describing advantageous effects of the pair of side wall intervening layers according to the modification.

FIG. 16 is a diagram illustrating a comparative example for the purpose of describing the advantageous effects of the pair of side wall intervening layers 30*ba* according to the modification. The diagram of FIG. 16 is comparable to the diagram of FIG. 10. A case 21Va shown in FIG. 16 differs from the case 21V shown in FIG. 10 by the configuration of a pair of bottom wall intervening layers 30*aa* and a pair of side wall intervening layers 30*b*V. The pair of bottom wall intervening layers 30*aa* have the same configuration as the configuration of the pair of bottom wall intervening layers 30*aa* shown in FIG. 15. The pair of side wall intervening layers 30*b*V are respectively arranged across the center of the case 21Va in the first direction D1. In the non-compressed state of the pair of side wall intervening layer 30*b*V (i.e., in the state shown by the one-dot chain line), the pair of side wall intervening layers 30*b*V respectively have a thickness T2. In placement regions where the side wall intervening layers 30*b*V are placed, there are large distributions of the interval between the third case side wall 215 and the cell stacked body 12 and the interval between the fourth case side wall 219 and the cell stacked body 12, due to the draft angle DA1. For example, the interval of the placement region on the upper side of the sheet surface is smaller than the interval of the placement region on the lower side of the sheet surface. This causes a variation in degree of compression of the side wall intervening layers 30*b*V in the first direction D1. Accordingly the side wall intervening layers 30*b*V on the upper side of the sheet surface have a larger load applied in its thickness direction, whereas the side wall intervening layers 30*b*V on the lower side of the sheet surface have a smaller load applied in its thickness direction. This causes a large distribution of the load applied to the side wall intervening layers 30*b*V and is thereby likely to fail to sufficiently exert the functions of the side wall intervening layers 30*b*V (i.e., the vibration suppressing function and the position misalignment reducing function).

The case 21 of the modification shown in FIG. 15 is, on the other hand, configured by the first case 28 and the second case 29. This configuration decreases the distributions of the interval between the third case side wall 215 and the cell stacked body 12 and the interval between the fourth case side wall 219 and the cell stacked body 12 in the placement regions where the side wall intervening layers 30*ba* are placed, due to the draft angles DA1 and DA2, compared with the configuration of the case 21Va shown in FIG. 16. In other words, this configuration is less likely to cause a variation in degree of compression of the side wall intervening layers 30*ba* in the first direction D1. This accordingly decreases the distribution of the load applied to the side wall intervening layers 30*ba* and is thereby less likely to decrease the functions of the side wall intervening layers 30*ba* (i.e., the vibration suppressing function and the position misalignment reducing function).

D. Modifications

D-1. First Modification

According to the above embodiment, the shortest length direction of the case 21 is the first direction D1 out of the stacking direction SD, the first direction D1 and the second direction D2. This configuration is, however, not essential. For example, the shortest length direction of the case 21 may be the stacking direction SD or may be the second direction D2. According to the above embodiment, when the fuel cell 100 is mounted on the vehicle, the second case side wall 213 is arranged to form the bottom face of the case 21. This arrangement is, however, not restrictive. For example, the fourth case side wall 219 may be arranged to form the bottom face of the case 21. In this arrangement, the horizontal direction of the sheet surface of FIG. 5 is the direction D1, and the vertical direction of the sheet surface of FIG. 5 is the second direction D2.

D-2. Second Modification

Figure 17:
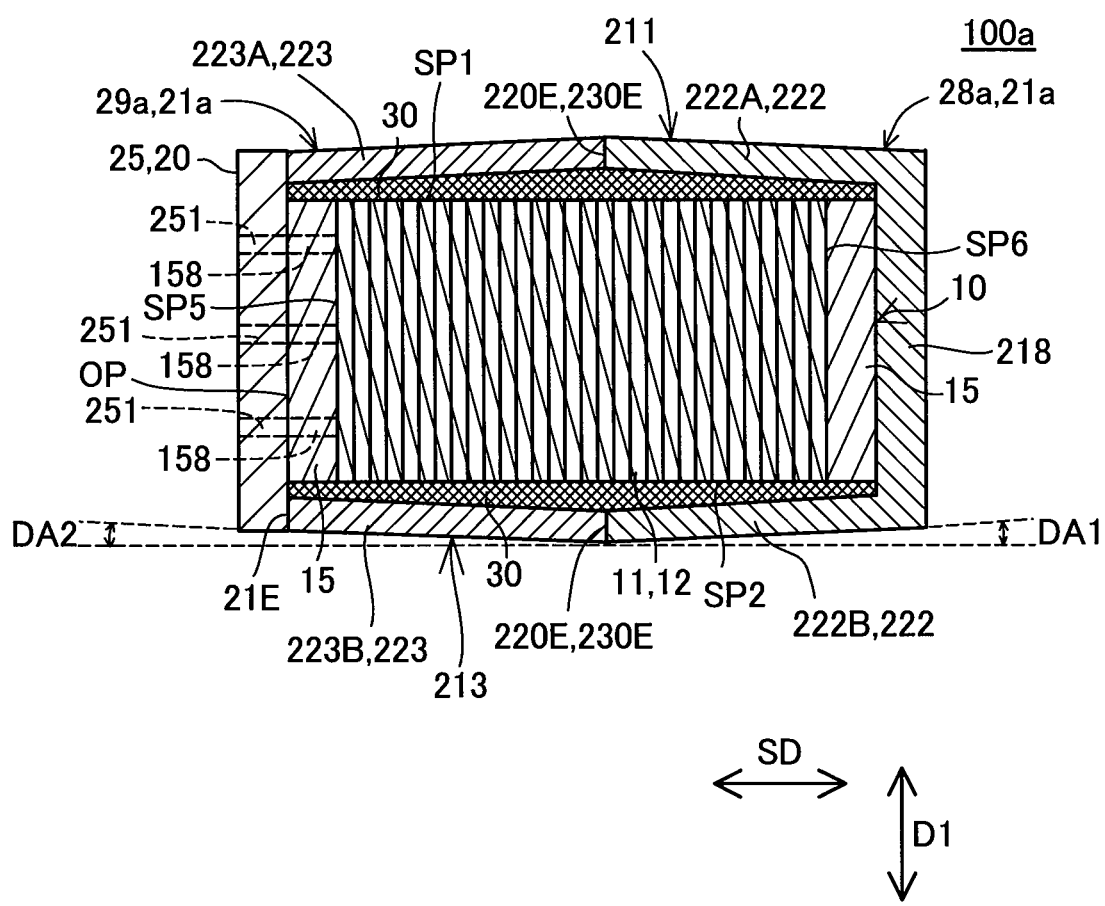
FIG. 17 is a diagram illustrating a second modification.

According to the above embodiment, the case 21 is divided into two parts in the first direction D1 that is the direction orthogonal to the stacking direction SD. This configuration is, however, not restrictive. FIG. 17 is a diagram illustrating a second modification. The diagram of FIG. 17 is comparable to the diagram of FIG. 1. The like components according to this modification to those of the fuel cell 10 of the above embodiment are expressed by like reference signs and are not specifically described. As shown in FIG. 17, a case 21*a* of a fuel cell 100*a* is configured by a first case 28*a* and a second case 29*a*. The case 21*a* is configured to include a case bottom wall 218 that is on one end in the stacking direction SD and an end face 21E that is on the other end in the stacking direction SD. The first case 28*a* includes a first surrounding wall 222 that is extended from the case bottom wall 218 toward the end face 21E. The first surrounding wall 222 has four walls (only a wall 222A and a wall 222B are shown in FIG. 17) that are opposed to the first to the fourth stacked body side faces SP1 to SP4. The first surrounding wall 222 is configured to have a draft angle DA1 that is extended to the outer side of the case 21*a* with an increase in distance from the case bottom wall 218 toward the end face 21E. The second case 29*a* includes a second surrounding wall 223 that is extended from the end face 21E toward the case bottom wall 218. The second surrounding wall 223 has four walls (only a wall 223A and a wall 223B are shown in FIG. 17) that are opposed to the first to the fourth stacked body side faces SP1 to SP4. The second surrounding wall 223 is configured to have a draft angle DA2 that is extended to the outer side of the case 21*a* with an increase in distance from the end face 21E toward the case bottom wall 218. An edge 220E of the first surrounding wall 222 on the end face 21E-side is joined with an edge 230E of the second surrounding wall 223 on the case bottom wall 218-side. This modified configuration also suppresses size expansion of the case 21*a* in the first direction D1 and in the second direction D2 that are orthogonal to the stacking direction SD, due to the draft angles DA1 and DA2. Even when an external force such as vibration is applied to the cell stacked body 12, the presence of intervening layers 30 suppresses the cell stacked body 12 from hitting against the case 21*a* and thereby reduces the possibility that the cell stacked body 12 is damaged or deformed. In this modified configuration, it is preferable that the length in the stacking direction SD among the lengths of the case 21*a* is shorter than the length in the first direction D1 and the length in the second direction D2. This configuration further suppresses size expansion of the case 21*a* due to the draft angles DA1 and DA2.

D-3. Third Modification

According to the above embodiment, the case 21 is configured to include the joint portions JP formed by joining the first case 28 with the second case 29 by friction stir welding. The joining technique is, however, not restricted to this embodiment, but any of other various joining techniques may be used to form the joint portions JP. For example, a fusion joining technique such as TIP welding, MIG welding or laser welding may be employed to join the first case 28 with the second case 29 and form the joint portions JP.

D-4. Fourth Modification

The case 21 is configured to have the case bottom wall 218 (as shown in FIG. 4) but may be configured without the case bottom wall 218 according to a modification. In this modification, the housing 20 includes a cover member that is configured to close an opposite opening of the case 21 that is opposite to the opening OP in the stacking direction SD.

The disclosure is not limited to any of the embodiment and its modifications described above but may be implemented by any of other various modifications without departing from the scope of the disclosure. The above embodiment and its modifications are provided only for the purpose of concretely illustrating the disclosure. The disclosure may not be necessarily restricted to the configuration including all the components described in any of the embodiment and its modifications. Part of the configuration described in any of the embodiment and its modifications may be replaced by the configuration of another of the embodiment and its modifications. Additionally, the configuration of another of the embodiment and its modifications may be added to the configuration of one of the embodiment and its modifications. Furthermore part of the configuration of any of the embodiment and its modifications may be replaced or deleted, or another configuration may be added to the configuration of any of the embodiment and its modifications. Any configurations of the embodiment and its modifications may be combined.

What is claimed is:

1. A fuel cell, comprising:
a cell stacked body provided by stacking a plurality of unit cells, the cell stacked body configured to include stacked body side faces arranged along a stacking direction of the plurality of unit cells; and
a case configured to surround at least the stacked body side faces of the cell stacked body, wherein
the case comprises:
a first case configured to include a first case side wall and a pair of first opposed side walls that are arranged to rise from a circumference of the first case side wall such as to have a draft angle, the pair of first opposed side walls configured to be opposed to each other across the cell stacked body; and
a second case configured to include a second case side wall that is opposed to the first case side wall across the cell stacked body, and a pair of second opposed side walls that are arranged to rise from a circumference of the second case side wall such as to have a draft angle, the pair of second opposed side walls configured to be opposed to each other across the cell stacked body; and
a case bottom wall that is located on one side of the cell stacked body in the stacking direction, wherein
a first edge of each of the first opposed side walls on an opposite side that is opposite to the first case side wall is welded at a joint portion with a second edge of each of the second opposed side walls on an opposite side that is opposite to the second case side wall,
a clamping force is applied to the cell stacked body from respective sides in the stacking direction,
the first case further comprises first intersecting wall that is arranged to rise from the circumference of the first case side wall such as to have a draft angle and is configured to intersect with the pair of first opposed side walls, and the second case further comprises a second intersecting wall that is arranged to rise from the circumference of the second case side wall such as to have a draft angle and is configured to intersect with the pair of second opposed side walls, wherein a third edge of the first intersecting wall on an opposite side that is opposite to the first case side wall is joined with a fourth edge of the second intersecting wall on an opposite side that is opposite to the second case side wall, and the first intersecting wall and the second intersecting wall constitute the case bottom wall, wherein the case bottom wall receives the clamping force and maintains the clamping force.

2. The fuel cell according to claim 1, wherein each of the pair of first opposed side walls has a length in a first direction in which the first case side wall and the second case side wall are opposed to each other, that is not less than ⅓ and not greater than ⅔ of a total length of the first opposed side wall and the second opposed side wall that are joined with each other in the first direction, and each of the pair of second opposed side walls has a length in the first direction that is not less than ½ and not greater than ⅔ of the total length of the first opposed side wall and the second opposed side wall that are joined with each other in the first direction.

3. A manufacturing method of the fuel cell according to claim 1, the manufacturing method comprising:

(a) a process of placing the first edge and the second edge to abut with each other in a first abutment portion and joining the first abutment portion by friction stir welding;

(b) a process of placing the third edge and the fourth edge to abut with each other in a second abutment portion and joining the second abutment portion by friction stir welding; and (c) a process of placing at least the cell stacked body inside of the case, after the process (a) and the process (b).

4. The manufacturing method of the fuel cell according to claim 3, wherein the process (a) performs the friction stir welding by using a first tool configured to include a first shoulder portion in a columnar shape and a first pin protruded from an end surface of the first shoulder portion, and the process (b) performs the friction stir welding by using a second tool configured to include a second shoulder portion in a columnar shape that has a different diameter from a diameter of the first shoulder portion, and a second pin protruded from an end surface of the second shoulder portion.

5. The fuel cell according to claim 2, wherein each of the pair of first opposed side walls has a length in the first direction that is ½ of a total length of the first opposed side wall and the second opposed side wall that are joined with each other in the first direction, and each of the pair of second opposed side walls has a length in the first direction that is ½ of the total length of the first opposed side wall and the second opposed side wall that are joined with each other in the first direction.

* * * * *

UNITED STATES PATENT AND TRADEMARK OFFICE
CERTIFICATE OF CORRECTION

Page 1 of 1

PATENT NO. : 10,559,841 B2
APPLICATION NO. : 15/622494
DATED : February 11, 2020
INVENTOR(S) : Yuma Takabatake et al.

It is certified that error appears in the above-identified patent and that said Letters Patent is hereby corrected as shown below:

On the Title Page

Item [73], should read:
TOYOTA JIDOSHA KABUSHIKI KAISHA, Toyota (JP)

Signed and Sealed this
Seventeenth Day of August, 2021

Drew Hirshfeld
*Performing the Functions and Duties of the*
*Under Secretary of Commerce for Intellectual Property and*
*Director of the United States Patent and Trademark Office*